(12) United States Patent
Tahara et al.

(10) Patent No.: US 7,616,858 B2
(45) Date of Patent: Nov. 10, 2009

(54) LIGHT GUIDING PLATE MADE OF TRANSPARENT RESIN, SURFACE-EMITTING LIGHT SOURCE APPARATUS AND PROCESS FOR MANUFACTURING LIGHT GUIDING PLATE

(75) Inventors: Hisashi Tahara, Hiratsuka (JP); Haruhiko Kurokawa, Hiratsuka (JP)

(73) Assignees: Mitsubishi Engineering-Plastics Corporation, Tokyo (JP); Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 11/883,632

(22) PCT Filed: Feb. 27, 2006

(86) PCT No.: PCT/JP2006/303591

§ 371 (c)(1),
(2), (4) Date: Aug. 3, 2007

(87) PCT Pub. No.: WO2006/098137

PCT Pub. Date: Sep. 21, 2006

(65) Prior Publication Data

US 2008/0144324 A1    Jun. 19, 2008

(30) Foreign Application Priority Data

Mar. 16, 2005  (JP) ............................. 2005-074304
Jan. 16, 2006  (JP) ............................. 2006-007373

(51) Int. Cl.
*G02B 6/10* (2006.01)

(52) U.S. Cl. ....................... 385/146; 362/311; 362/317; 264/1.7

(58) Field of Classification Search ................. 385/146, 385/133; 362/331, 317, 311; 264/1.7
See application file for complete search history.

(56) References Cited

U.S. PATENT DOCUMENTS

| 6,486,570 | B1 | 11/2002 | Price et al. |
| 6,508,564 | B1 | 1/2003 | Kuwabara et al. |
| 6,601,961 | B1 | 8/2003 | Masaki |
| 6,952,310 | B1 | 10/2005 | Miyatake et al. |
| 2002/0181224 | A1* | 12/2002 | Tahara et al. .................. 362/31 |
| 2003/0034445 | A1* | 2/2003 | Boyd et al. ............ 250/227.11 |
| 2004/0042233 | A1* | 3/2004 | Suzuki et al. ............... 362/561 |

(Continued)

FOREIGN PATENT DOCUMENTS

JP    11-120811    4/1999

(Continued)

*Primary Examiner*—Ellen Kim
(74) *Attorney, Agent, or Firm*—Wenderoth, Lind & Ponack, L.L.P.

(57) ABSTRACT

A light guiding plate is made of a transparent thermoplastic resin and has a first main surface, a second main surface opposed to said first main surface, a first side wall, a second side wall, a third side wall opposed to said first side wall and a fourth side wall opposed to said second side wall. The surface portion of the first main surface is provided with convex portions and/or concave portions, and the light guiding plate has a longitudinal-direction length, which is a length from the first side wall to the third side wall, of 40 mm or more but 130 mm or less, at least 80% region of the light guiding plate has a thickness of 0.1 mm or more but 0.55 mm or less.

9 Claims, 12 Drawing Sheets

U.S. PATENT DOCUMENTS

| | | |
|---|---|---|
| 2004/0119204 A1 | 6/2004 | Nishigaki |
| 2004/0246581 A1 | 12/2004 | Miyatake et al. |
| 2005/0049368 A1* | 3/2005 | Maruyama et al. .......... 525/394 |
| 2005/0175283 A1* | 8/2005 | Park et al. ...................... 385/36 |
| 2005/0250930 A1* | 11/2005 | Ikeda et al. ................. 528/196 |
| 2005/0286854 A1* | 12/2005 | Honma et al. ............... 385/146 |
| 2006/0120111 A1* | 6/2006 | Onishi ........................ 362/626 |
| 2006/0215409 A1* | 9/2006 | Ohmi et al. ................. 362/341 |
| 2007/0025680 A1* | 2/2007 | Winston et al. ............. 385/146 |

FOREIGN PATENT DOCUMENTS

| | | |
|---|---|---|
| JP | 2000-229343 | 8/2000 |
| JP | 2001-155524 | 6/2001 |
| JP | 2003-14938 | 1/2003 |
| JP | 2003-90901 | 3/2003 |
| JP | 3422475 | 4/2003 |
| JP | 2004-51700 | 2/2004 |
| JP | 2004-202731 | 7/2004 |

* cited by examiner

MARK OF MOLTEN RESIN INJECTION PORTION

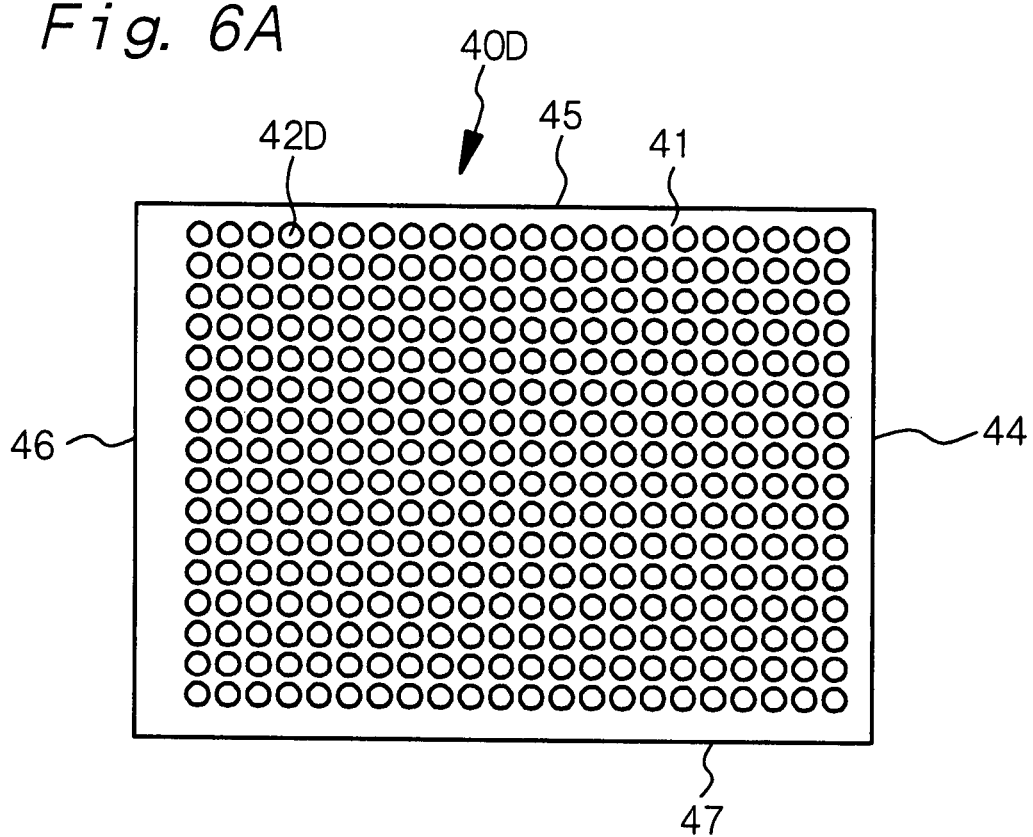
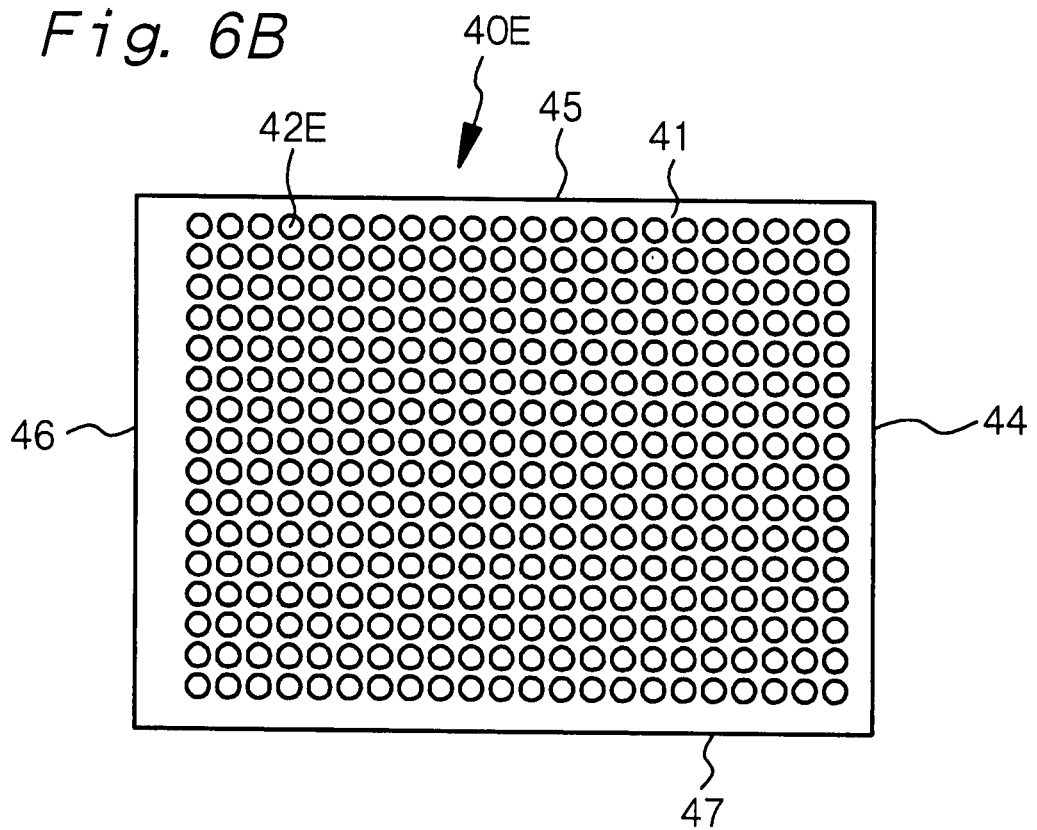

Fig. 10A
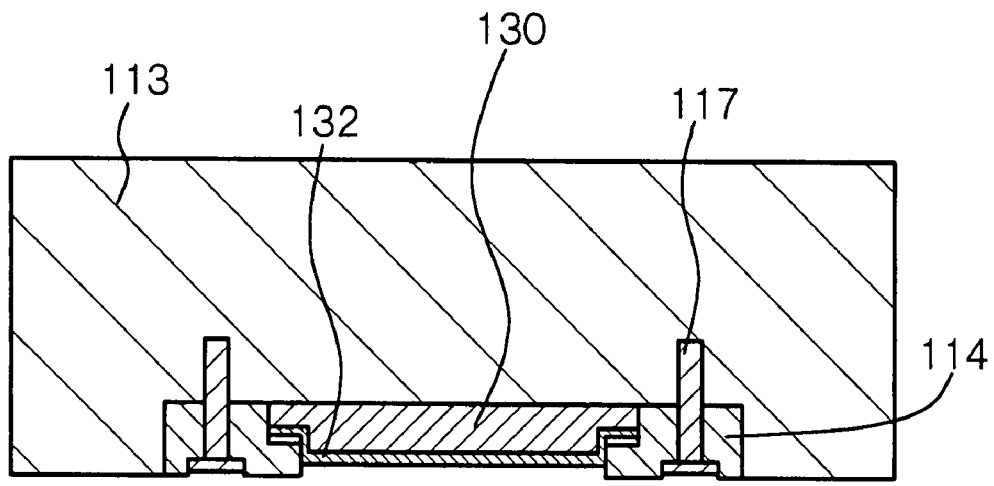
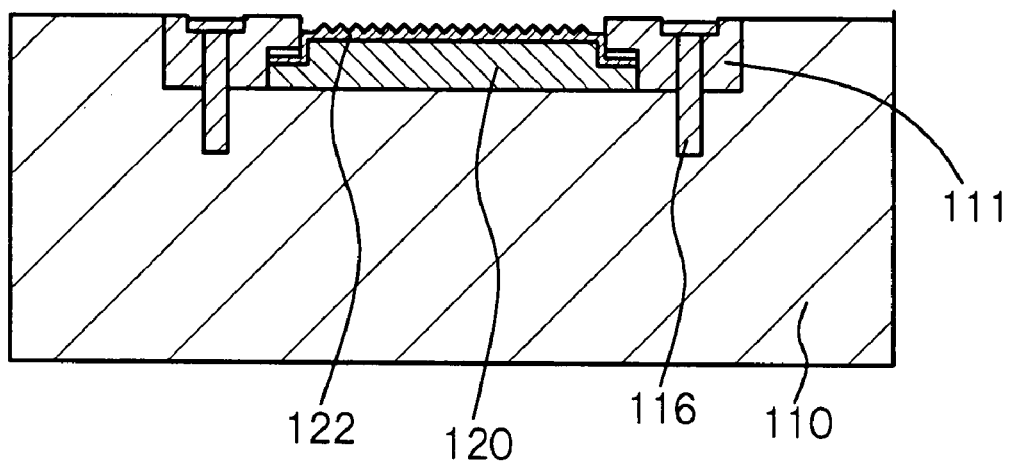
Fig. 10B
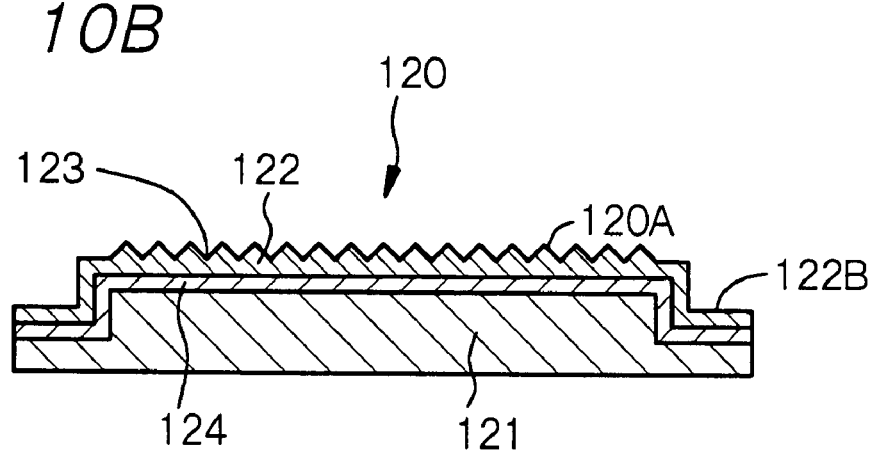

LIGHT GUIDING PLATE MADE OF TRANSPARENT RESIN, SURFACE-EMITTING LIGHT SOURCE APPARATUS AND PROCESS FOR MANUFACTURING LIGHT GUIDING PLATE

TECHNICAL FIELD

This invention relates to a light guiding plate made of a transparent thermoplastic resin for a liquid crystal display unit for use in a personal computer, a cellphone, PDA (Personal Digital Assistant), a car navigation unit and a game console or for other object, a surface-emitting light source apparatus into which the above light guiding plate is incorporated, and a process for manufacturing a light guiding plate.

BACKGROUND ART

A liquid crystal display unit for use in a personal computer, a cellphone, PDA, a car navigation unit, a game console and the like has a surface-emitting light source apparatus incorporated therein for coping with demands for a decrease in thickness and weight, electric power saving, higher brightness and higher definition with regard to a liquid crystal display unit. The light guiding plate has a first main surface and a flat second main surface opposed to the first main surface and is generally manufactured from a transparent material.

A light guiding plate 40 whose schematic cross-sectional view is shown in FIG. 1(A) has a first main surface 41, a second main surface 43 opposed to the first main surface 41, a first side wall 44, a second side wall 45, a third side wall 46 opposed to the first side wall 44 and a fourth side wall 47 opposed to the second side wall 45. The first main surface 41 has a surface portion provided with concavo-convex portions 42.

In a backlight-type-surface-emitting light source apparatus for use with a liquid crystal display unit, the light guiding plate 40 is arranged to ensure that the second main surface 43 thereof faces a liquid crystal display unit 60 as a schematic cross-sectional view is shown in FIG. 1(B). Light is emitted from a light source 50 and enters through the first side wall 44 of the light guiding plate 40. The light is divided into light that is reflected on the first main surface 41 and emitted from the second main surface 43 and light that is transmitted through the first main surface 41. The light transmitted through the first main surface 41 is reflected on a reflection member 51 disposed in a position facing the first main surface 41, re-enters the guiding plate 40 and is emitted through the second main surface 43. Light emitted through the second main surface 43 is guided to the liquid crystal display unit 60 that is disposed so as to face the second main surface 43. Between the liquid crystal display unit 60 and the second main surface 43 of the light guiding plate 40, generally, a prism sheet 55 and a diffusing sheet 52 are disposed in the form of a stack to uniformly diffuse light.

In a front-light-type surface-emitting light source apparatus for use with a liquid crystal display unit, the light guiding plate 40 is arranged to ensure that the second main surface 43 thereof faces a liquid crystal display unit 60 as a conceptual view is shown in FIG. 1(C). Light is emitted from a light source 50 and enters through the first side wall 44 of the light guiding plate 40. The light is reflected on the first main surface 41 and emitted from the second main surface 43. The light is passed through the liquid crystal display unit 60 arranged in a position facing the second main surface 43, and the light is reflected on a reflection member 54 and passed again through the liquid crystal display unit 60. This light further passes through a retardation film 53 and an anti-reflection layer (not shown) formed on the second main surface 43 of the light guiding plate 40 and is emitted from the first main surface 41 of the light guiding plate 40 to be recognized as an image. The front-light-type surface-emitting light source apparatus is a system that is brighter than the backlight-type surface-emitting light source apparatus and that can be kept bright with outside light alone in a day time, so that it has an advantage that its power consumption can be decreased.

Meanwhile, the prism sheet 55 is expensive and when a plurality of such sheets are used, the problem is that the number of assembling steps increases. This problem is hence overcome by forming prism-shaped concavo-convex portions 42 on the first main surface 41 of the light guiding plate 40 (for example, see JP-A-H10-55712). For attaining low power consumption and high brightness, it is required to improve the luminance efficiency by increasing the density of the prism-shaped concavo-convex portion 42 as it can be. Further, it is also under study to form a blast-embossed surface having a light diffusion effect on the second main surface 43 for removing the diffusing sheet.

Conventionally, the above light guiding plate is manufactured by an injection molding method. That is, a mold assembly having a molten resin injection portion (gate portion) and a cavity is provided, and a transparent molten thermoplastic resin is injected into the cavity through the molten resin injection portion to form the light guiding plate. It has been general practice to select the transparent thermoplastic resin from materials such as PMMA and the like. However, the amount of heat generated in a unit such as a cellphone, PDA and the like tends to increase, and a polycarbonate resin having high heat resistance is being substituted therefor.

The liquid crystal display unit for use in a cellphone and the like currently has a thickness of approximately 3 mm, and the light guiding plate has a thickness of approximately 0.7 mm when it is the thinnest. For complying with strong demands for a further decrease in thickness of a liquid crystal display unit, the light guiding plate is also required to be as thin as less than 0.7 mm.

Patent Document 1: JP-A-H10-138275
Patent Document 2: JP-A-H10-052839
Patent Document 3: JP-A-H10-055712
Patent Document 4: JP-A-H11-058406
Patent Document 5: JP-A-2004-050819
Patent Document 6: JP-A-2003-014938

PROBLEMS TO BE SOLVED BY THE INVENTION

JP-A-H10-138275 discloses a light guiding plate having a thickness of 0.1 mm to 10 mm and an injection molding method thereof. Further, JP-A-H10-052839 and JP-A-H10-055712 disclose a light guiding plate having a 0.1 mm to 1 mm thick small-thickness portion and a large-thickness portion which is different from the small-thickness portion in thickness by at least 0.5 mm and an injection molding method thereof. Furthermore, JP-A-H11-058406 discloses a thin-plate-shaped molded article having a thickness of 0.1 mm to 7 mm and an injection molding method thereof. JP-A-2004-050819 discloses a 0.1 mm to 30 mm thick molded article and an injection molding method thereof. Moreover, when it is attempted to form a light guiding plate having prism-shaped concavo-convex portions on a surface from a polycarbonate resin having poor flowability by an injection molding method, one problem is that no prism-shaped concavo-convex portions can be formed on that surface portion of a light guiding plate which is positioned far from a gate portion. For example, JP-A-2003-14938 discloses means for overcoming the above problem.

In Examples of the above Laid-Open Japanese patent applications, however, the light guiding plates or molded articles have a thickness of 0.7 mm or more, and they have a size of 100 mm or more. Light guiding plates and molded articles having such a thickness and such a size can be produced by those methods disclosed in the above Laid-Open Japanese patent applications. However, when it is attempted to produce a light guiding plate having a thickness of less than 0.7 mm by those techniques disclosed in these Laid-Open Japanese patent applications, that portion of a cavity which corresponds to the end of flow (a position farthest from the molten resin injection portion (gate portion)) cannot be fully filled with a molten thermoplastic resin, and no intended light guiding plate can be produced.

It is therefore an object of the present invention to provide a very thin light guiding plate having a thickness of less than 0.7 mm, a surface-emitting light source apparatus into which the above light guiding plate is incorporated and a process for manufacturing the above light guiding plate.

SUMMARY OF THE INVENTION

The light guiding plate of the present invention for achieving the above object is a light guiding plate being made of a transparent thermoplastic resin and having a first main surface, a second main surface opposed to said first main surface, a first side wall, a second side wall, a third side wall opposed to said first side wall and a fourth side wall opposed to said second side wall, wherein the surface portion of the first main surface is provided with convex portions and/or concave portions (namely, provide with convex portions or provided with concave portions or provided with convex portions and concave portions), the light guiding plate has a longitudinal-direction length, which is a length from the first side wall to the third side wall, of 40 mm or more but 130 mm or less, preferably 45 mm or more but 120 mm or less, at least 80% region of the light guiding plate has a thickness of 0.1 mm or more but 0.55 mm or less, preferably 0.15 mm or more but 0.50 mm or less, and the light guiding plate has a flatness of 200 μm or less.

The surface-emitting light source apparatus of the present invention for achieving the above object comprises a light guiding plate and a light source, wherein the light guiding plate is made of a transparent thermoplastic resin and has a first main surface, a second main surface opposed to said first main surface, a first side wall, a second side wall, a third side wall opposed to said first side wall and a fourth side wall opposed to said second side wall, the surface portion of the first main surface is provided with convex portions and/or concave portions (namely, provide with convex portions or provided with concave portions or provided with convex portions and concave portions), the light guiding plate has a longitudinal-direction length, which is a length from the first side wall to the third side wall, of 40 mm or more but 130 mm or less, preferably 45 mm or more but 120 mm or less, at least 80% region of the light guiding plate has a thickness of 0.1 mm or more but 0.55 mm or less, preferably 0.15 mm or more but 0.50 mm or less, the light guiding plate has a flatness of 200 μm or less, and the light guiding plate is constituted to receive light through the first side wall and to emit light from the first main surface and/or the second main surface.

In the surface-emitting light source apparatus, the light source is disposed, for example, to the first side wall (light-entering surface) that is an end of the light guiding plate. And, light is emitted from the light source and enters the light guiding plate through the first side wall, and the light is scattered by the convex portions or concave portions formed on the first main surface of the light guiding plate and is emitted from the first main surface and/or the second main surface.

Further, the process for manufacturing a light guiding plate, provided by the present invention for achieving the above object, is a process for manufacturing a light guiding plate that is made of a transparent thermoplastic resin and that has a first main surface, a second main surface opposed to said first main surface, a first side wall, a second side wall, a third side wall opposed to said first side wall and a fourth side wall opposed to said second side wall, wherein the surface portion of the first main surface is provided with convex portions and/or concave portions, the light guiding plate has a longitudinal-direction length, which is a length from the first side wall to the third side wall, of 40 mm or more but 130 mm or less, at least 80% region of the light guiding plate has a thickness of 0.1 mm or more but 0.55 mm or less, and the light guiding plate has a flatness of 200 μm or less, the process comprising providing a mold assembly having a cavity and a molten resin injection portion for injecting a molten thermoplastic resin into the cavity from a portion (cavity surface) corresponding to one of the side walls of the light guiding plate, the mold assembly having a constitution of a first mold member and a second mold member, the process comprising the steps of (A) clamping the first mold member and the second mold member with a clamping force $F_0$ to form the cavity, (B) injecting a transparent molten thermoplastic resin into the cavity from the molten resin injection portion, (C) adjusting the clamping force to $0.5 F_0$ or less after an elapse of t second(s) from completion of a step of injecting a molten thermoplastic resin into the cavity or after an elapse of t second(s) from completion of a dwelling step that follows a step of injecting a molten thermoplastic resin into the cavity (provided that 0 second$\leq$t$\leq$8.0 seconds), and (D) after cooling and solidification of the thermoplastic resin in the cavity, disassembling the first mold member and the second mold member to take out the light guiding plate.

In the process for manufacturing a light guiding plate of the present invention, the clamping forces $F_1$ is adjusted to $0.5 F_0$ or less upon completion of the step of injecting a molten thermoplastic resin into the cavity (that is, t=0), or within an elapse of 8.0 seconds after the above completion of injecting a molten thermoplastic resin into the cavity (that is, 0<t$\leq$8 seconds), or upon completion of the dwelling step that follows the step of injecting a molten thermoplastic resin into the cavity (a time period for the dwelling step is taken as t' second) (that is t=0), or within an elapse of 8.0 seconds after completion of the dwelling step that follows the step of injecting a molten thermoplastic resin into the cavity (that is, 0$\leq$t$\leq$8 seconds). The above time period t is preferably 0.5 second$\leq$t$\leq$6 seconds, more preferably 1 second$\leq$t$\leq$4 seconds. More practically, the above time period t can be set while a molded light guiding plate is observed for a deformation state. When the value of t exceeds 8 seconds, generally, the cooling-induced shrinkage of the thermoplastic resin in the cavity finishes and there is brought a state in which a strain remains in the thermoplastic resin. As a result, the light guiding plate may be distorted or swollen or the flatness thereof may be decreased. It is desirable to satisfy $0 \leq F_1/F_0 \leq 0.5$, preferably $0 \leq F_1/F_0 \leq 0.4$, more preferably $0 \leq F_1/F_0 \leq 0.3$. More practically, the value of $F_0$ and the value of $F_1$ can be determined while a molded light guiding plate is observed for a deformation state. When the clamping force $F_1$ is not adjusted to 0.5 $F_0$ or less, a strain generated in the thermoplastic resin in the cavity is not easily freed. As a result, the light guiding plate may be distorted or swollen or the flatness thereof may be decreased.

Further, the value of the clamping force $F_0$ preferably satisfies $F_0 \geq 9.\ 8 \times 10^3 \times S_{MAX}(N) (= S_{MAX} \times 10^3$ kgf) in which $S_{MAX}$ (cm$^2$) is a maximum cross-sectional area when the light guiding plate is sectioned with an imaginary plane perpendicular to the direction in which the clamping force $F_0$ is applied. Although depending upon an injection molding machine, the upper limit of the clamping force $F_0$ is, for example, $9 \times 10^4 \times S_{MAX}(N)$ ($= S_{MAX} \times 3 \times 10^3$ kgf). When the value of the clamping force $F_0$ is too small, a bur may be occurred on the light guiding plate. When it is too large, it is no longer possible to promote the discharging of air or gas generated from a resin through a parting line, so that the flowability of the molten thermoplastic resin in the cavity is degraded to some extent and a strain may remain in the light guiding plate. It is hence required to adjust the value of the clamping force $F_0$ as required.

Generally, a thermoplastic resin measured, elasticized and melted in an injection cylinder of an injection molding apparatus is injected from the injection cylinder and introduced (injected) into the cavity through a sprue and a molten resin injection portion (gate portion) of a mold assembly having a constitution of a fixed mold member and a movable mold member and is caused to dwell. In the dwelling step, the injection pressure is switched to other any adjustable pressure (secondary injection pressure) different from the injection pressure, so that the backflow of the molten thermoplastic resin is prevented and that a molten thermoplastic resin is supplemented into the cavity for preventing the shrinkage of the thermoplastic resin in the cavity which shrinkage would be caused by cooling and solidification. After solidification of the molten resin in the molten resin injection portion (gate portion), the dwelling is no more necessary, so that the time for the dwelling step (dwelling time period) t' is generally determined by taking account of a time period taken until the solidification of the molten resin in the molten resin injection portion (gate portion). In the process for manufacturing a light guiding plate of the present invention, the injection molding is carried out to produce the light guiding plate having a very small thickness of 0.1 mm to 0.55 mm, so that the dwelling time period t' can be 0 second in some cases, or that it shall not be specially limited, but for example, desirably, the time period (dwelling time period) t' for the dwelling step of applying a pressure of $1 \times 10^8$ Pa or less as a holding pressure is adjusted to 2 seconds or less (t'$\leq$2), preferably 0.1 second$\leq$t'$\leq$1 second. When the pressure (holding pressure) in the dwelling step is too high or when the dwelling time period is too long, it causes the deformation of the light guiding plate. After an elapse of t second(s) from completion of the step of injecting a molten thermoplastic resin into the cavity, the clamping force is adjusted to 0.5 $F_0$ or less, and before an elapse of t second(s) from completion of the step of injecting a molten thermoplastic resin into the cavity, the clamping force is maintained at $F_0$ and no holding pressure is applied (that is, no pressure is applied from the injection cylinder to the thermoplastic resin in the cavity). Alternatively, after an elapse of t second(s) from completion of the step of injecting a molten thermoplastic resin into the cavity and the subsequent dwelling step, the clamping force is adjusted to 0.5 $F_0$, and before an elapse of t second(s) from completion of the step of injecting a molten thermoplastic resin into the cavity and the subsequent dwelling step, the clamping force is maintained at $F_0$. In addition, since the dwelling step is completed, no pressure is applied from the injection cylinder to the thermoplastic resin in the cavity.

In the process for manufacturing a light guiding plate of the present invention, as required, a release resistance is decreased by releasing the light guiding plate from the cavity wall surface by means of air blow inside the cavity before mold opening or air blow is employed in combination during mold opening or before ejection, whereby the deformation of the light guiding plate, which is improved in transfer characteristic, during the release of it from the mold can be suppressed and an improvement in flatness can be more effectively accomplished.

In the light guiding plate of the present invention, the surface-emitting light source apparatus of the present invention or the process for manufacturing a light guiding plate of the present invention (these will be sometimes generically referred to as "the present invention" hereinafter), desirably, the flatness of the light guiding plate is 200 µm or less, preferably 150 µm or less, more preferably 100 µm or less.

The flatness can be measured according to JIS B 7513-1992. However, since the light guiding plate has a small thickness and hence would be distorted due to a contact pressure of a probe, no accurate value may be obtained, so that it is desirable to use a low-pressure probe having a low contact pressure or a contact-free laser probe for the measurement. Specifically, the light guiding plate includes three types;

(1) a thin-plate-shaped light guiding plate having a nearly constant thickness, (2) a light guiding plate having a large-thickness portion in the vicinity of the first side wall as a light-entering surface and having a nearly constant thickness in the other portion, and (3) a wedged light guiding plate whose thickness decreases from the first side wall as a light-entering surface to the third surface opposed to the light-entering surface (for example, a side wall positioned in the vicinity of the molten resin injection portion).

A surface corrected by measuring at least three portions of the plight guiding plate placed on a level block is used as a reference surface, and at least 21 portions of a sample surface are measured to obtain the flatness. In this case, when the light guiding plate is a light guiding plate having a constant thickness, it is always required to measure four corners and a central portion thereof. In the light guiding plate having a large-thickness portion in the vicinity of the first side wall as a light-entering surface, it is desirable to preclude the large-thickness portion from the measurement. In the light guiding plate whose first side wall alone has a large thickness, it is desirable to preclude such a portion from the measurement. The sample surface is defined to be the first main surface provided with concave portions and/or convex portions.

In the light guiding plate of the present invention or the surface-emitting light source apparatus of the present invention, it is preferred to employ a constitution in which there is provided a mold assembly having a cavity and a molten resin injection portion for injecting a molten thermoplastic resin into the cavity from a cavity surface corresponding to one side wall of the light guiding plate (one side wall which is the first side wall, the second side wall, the third side wall or the fourth side wall and is preferably the first side wall) and the light guiding plate is produced by injecting a transparent molten thermoplastic resin into the cavity through the molten resin injection portion. In this case or the process for manufacturing a light guiding plate of the present invention, for example, when the light guiding plate having a longitudinal-direction length of 52 mm, which is a length from the first side wall to the third side wall, and having a thickness of 0.3 mm is produced by injecting a molten thermoplastic resin having a Q value of 0.60 into the cavity through a molten resin injection portion under an injection molding condition at a resin temperature of 360° C., desirably, the resin injection speed is 1.2 m·second$^{-1}$ or more, preferably 1.5 m·second$^{-1}$ or more, still more preferably 2.0 m·second$^{-1}$ or more. In a general injection molding method, when a molten thermoplastic resin is injected into a cavity through a molten resin injection portion, the resin injection speed is generally approximately 0.1 m·second$^{-1}$ to 0.3 m·second$^{-1}$. In a preferred embodiment of the present invention, the resin injection speed is 20 times or more as fast as that in a conventional injection molding method. A transparent molten thermoplastic resin is injected into the cavity through the molten resin injection portion at the above high speed beyond comparison with a conventional technique as described above, so that the molten thermoplastic resin can be reliably and completely filled in the cavity having a small space thickness. By increasing the resin temperature to 360° C. or higher, the resin can be injection-molded according to a conventional injection molding method in which the injection speed is 0.1 m·second$^{-1}$ to 0.3 m·second$^{-1}$. However, under some molding conditions, there may be involved a problem that a thermoplastic resin is yellowed by thermal decomposition to decrease the luminance or product quality of the light guiding plate.

In the present invention including the above embodiment, it is preferred employ a constitution in which inside the mold assembly is provided an insert block comprising an insert block body made of zirconia ceramic or electrically conductive zirconia ceramic and a metal layer having concave portions and/or convex portions and being arranged on that surface of the insert block body which faces the cavity for forming the concave portions and/or the convex portions on the first main surface.

When the insert block body is constituted from a low heat-conductivity material such as zirconia ceramic or electrically conductive zirconia ceramic, the rapid cooling of a molten thermoplastic resin in the cavity can be prevented. As a result, the flowability of the molten thermoplastic resin is improved, it is possible to stop the molten thermoplastic resin that comes in contact with the metal layer from forming a solidification layer, and the cavity can be reliably and fully filled with the molten thermoplastic resin in spite of the very small space thickness of the cavity. Further, the form of the concave portions and/or the convex portions formed in the metal layer can be reliably, accurately and highly precisely transferred to the light guiding plate.

In the present invention including the above preferred embodiment, light enters the first side wall of the light guiding plate, and it is preferred to employ a constitution in which a molten thermoplastic resin is injected into the cavity from that surface of the cavity which corresponds to the third side wall of the light guiding plate.

In the present invention including the above preferred embodiment, desirably, the Q value of the thermoplastic resin is 0.5 cm$^3$·second$^{-1}$ or more, preferably 0.6 cm$^3$·second$^{-1}$ or more. The Q value of a thermoplastic resin as used hereinafter refers to a flow amount (unit: cm$^3$·second$^{-1}$) of a molten thermoplastic resin that is caused to flow out from a nozzle having a diameter of 1 mm and a length of 10 mm in a state where the molten thermoplastic resin is heated to 280° C. and a load of 1.57×10$^7$ Pa (160 kgf/cm$^2$) is exerted thereon, with a "KOKA" Flowtester (supplied by Shimadzu Corporation). It can be said that a molten thermoplastic resin having a higher Q value has higher flowability. However, when the Q value is too high, a thermoplastic resin having such a Q value has little tenacity and the light guiding plate tends to break, so that the upper limit of the Q value is practically 1.5 cm$^3$·second$^{-1}$. For example, conventional aromatic polycarbonate resins have a maximum Q value of 0.36 to 0.40 cm$^3$·second$^-$ at the highest, and the above Q value of 0.5 cm$^3$·second$^{-1}$ or more is remarkably as high as is not found with regard to any conventional aromatic polycarbonate resin.

In the present invention including the above various preferred embodiments, examples of the thermoplastic resin include aromatic polycarbonate resins, polymethyl methacrylate resins, cycloolefin resins such as "ZEONOR" which is a norbornene-based polymer resin and supplied by ZEON CORPORATION, transparent polyimide resins, alicyclic acrylic resins, styrene resins such as a polystyrene, and aromatic polycarbonate resins are preferred.

The polycarbonate suitable for use in the present invention can be produced according to a known method including various production methods such as an interfacial polymerization method, a pyridine method, an ester exchange method and a ring-opening polymerization method with regard to a cyclic carbonate compound. Specifically, the polycarbonate refers to a polymer or copolymer that is a linear or branched thermoplastic aromatic polycarbonate obtained by reacting an aromatic dihydroxy compound and optionally a small amount of a polyhydroxy compound with carbonyl chloride that is known as phosgene, a carbonate diester typified by dimethyl carbonate or diphenyl carbonate, or a carbonyl compound such as carbon monoxide and carbon dioxide.

Examples of the aromatic dihydroxy compound as a raw material include 2,2-bis(4-hydroxyphenyl)propane (=bisphenol A), 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxyphenylsulfone, bis(4-hydroxyphenyl)sulfide, 4,4'-dihydroxydiphenyl ether, 4,4'-dihydroxy-3,3'-dichlorodiphenyl ether and 4,4'-dihydroxy-2,5-diethoxydiphenyl ether. Of these, bis(4-hydroxyphenyl)alkanes are preferred, and 2,2-bis(4-hydroxyphenyl)propane (called bisphenol A) is particularly preferred. These aromatic dihydroxy compounds may be used singly or in combination.

For obtaining a branched polycarbonate, the above aromatic dihydroxy compound can be partially replaced with a polyhydroxy compound typified by fluoroglucine, 4,6-dimethyl-2,4,6-tris(4-hydroxyphenyl)heptene-2,4,6-dimethyl-2,4,6-tris(4-hydroxyphenyl)heptane, 2,6-dimethyl-2,4,6-tris(4-hydroxyphenyl)heptane-3,1,3,5-tris(4-hydroxyphenyl)benzene and 1,1,1-tris(4-hydroxyphenyl)ethane, or 3,3-bis(4-hydroxyaryl)oxyindole (=isatin bisphenol), 5-chloroisatin bisphenol, 5,7-dichloroisatin bisphenol or 5-bromoisatin bisphenol. The amount thereof for use is 0.01 to 10 mol %, preferably 0.1 to 2 mol %.

In a reaction by an interfacial reaction, an aromatic dihydroxy compound and optionally a molecular weight modifier (terminal stopper) are reacted with phosgene in the presence of a solvent inert to the reaction and an alkali aqueous solution optionally in the presence of an antioxidant for preventing the oxidation of the aromatic dihydroxy compound while the reaction mixture is maintained at a pH of 10 or higher, and then, a polymerization catalyst such as a tertiary amine or quaternary ammonium salt is added to carry out an interfacial polymerization, whereby a polycarbonate can be obtained. The molecular weight modifier can be added at any time without any limitation so long as it is added at a time from the formation of phosgene to the start of the polymerization. The reaction temperature is 0 to 35° C., and the reaction time period is several minutes to several hours.

The above organic solvent inert to the reaction includes chlorinated hydrocarbons such as dichloromethane, 1,2-dichloroethane, chloroform, monochlorobenzene, dichlorobenzene, etc., and aromatic hydrocarbons such as benzene, toluene, xylene, etc. The molecular weight modifier or terminal stopper includes compounds having a monohydric phenolic hydroxyl group and specifically includes m-methylphenol, p-methylphenol, m-propylphenol, p-propylphenol, p-tert-butylphenol, p-long-chain-alkyl-substituted phenol, etc. The amount of the molecular weight modifier per 100 mol of the aromatic dihydroxy compound is 50 to 0.5 mol, preferably 30 to 1 mol. The polymerization catalyst includes tertiary amines such as trimethylamine, triethylamine, tributylamine, tripropylamine, trihexylamine, pyridine, etc.; and quaternary ammonium salts such as trimethylbenzylammonium chloride, tetramethylammonium chloride, triethylbenzylammonium chloride, etc.

The reaction by an ester exchange method is an ester exchange reaction between a carbonate diester and an aromatic dihydroxy compound. Generally, the mixing ratio of the carbonate diester and the aromatic dihydroxy compound is adjusted and the pressure reduction degree during the reaction is adjusted thereby to determine a desired molecular weight and a terminal hydroxyl group content of a polycarbonate. As a more positive method, there is well known an adjusting method in which a terminal stopper is added during the reaction. The above terminal stopper includes monohydric phenols, monovalent carboxylic acids and carbonate diesters. The terminal hydroxyl group content has a great effect on the thermal stability, hydrolysis stability and color of a polycarbonate, and for imparting the polycarbonate with practical properties, the above content is preferably 1000 ppm or less, particularly preferably 700 ppm or less. Further, in a polycarbonate produced by the ester exchange method, when the terminal hydroxyl group content is too small, the polycarbonate is not increased in molecular weight thereof and is poor in color, so that the above content is preferably 100 ppm or more. Per mole of the aromatic dihydroxy compound, therefore, the carbonate diester is generally used in an equimolar amount or more, preferably in an amount of 1.01 to 1.30 mol.

When a polycarbonate is produced by an ester exchange method, an ester exchange catalyst is used. While the ester exchange catalyst is not specially limited, an alkali metal compound and/or an alkaline earth metal compound are/is mainly used, and as an auxiliary, a basic compound such as a basic boron compound, a basic phosphorus compound, a basic ammonium compound or an amine-containing compound can be used in combination. In an ester exchange reaction using these materials, there is employed a method in which the reaction is carried out at a temperature of 100 to 320° C. and finally the reaction of a melt polycondensation is carried out under a reduced pressure of $2.7 \times 10^2$ Pa (2 mmHg) or less while byproducts such as an aromatic hydroxyl compound, etc., are removed. While the melt polycondensation can be carried out by a batch method or a continuous method, the melt polycondensation by a continuous method is preferred for a polycarbonate suitable for use in the present invention in view of stability and the like. In the ester exchange method, preferably, a compound that neutralizes a catalyst in the polycarbonate, such as a sulfur-containing acidic compound or a derivative therefrom, is used as a deactivator for the catalyst. The amount thereof based on the alkali metal of the catalyst is in the range of 0.5 to 10 equivalent weights, preferably 1 to 5 equivalent weights, and the amount thereof based on the polycarbonate is generally in the range of 1 to 100 ppm, preferably 1 to 20 ppm.

In the present invention including the above-explained various preferred embodiments, desirably, the thermoplastic resin is an aromatic polycarbonate resin having a viscosity average molecular weight (Mv) of $1.0 \times 10^4$ to $1.5 \times 10^4$, preferably $1.1 \times 10^4$ to $1.4 \times 10^4$. When the viscosity average molecular weight of the aromatic polycarbonate resin is less than $1.0 \times 10^4$, the mechanical strength of the light guiding plate may decrease and the required performances of the light guiding plate may not be satisfied. When the viscosity average molecular weight of the aromatic polycarbonate resin exceeds $1.5 \times 10^4$, the aromatic polycarbonate resin that is melted is poor in flowability and has a moldability problem, and it is difficult to obtain a desired light guiding plate.

The viscosity average molecular weight (Mv) is calculated on the basis of the following equation using an intrinsic viscosity [η] determined on the basis of a solution viscosity measured with an Ubbelode viscometer at a temperature of 25° C. using methylene chloride as a solvent.

$$\eta = 1.23 \times 10^{-4} \times Mv^{0.83}$$

In the present invention including the above-explained various preferred embodiments, desirably, the values of (x,y) of the light guiding plate in the xy chromaticity diagram in the CIE 1931 XYZ color system that is an international notation determined by CIE (Commission Internationale de l'Eclairage) in 1931 satisfy $x \leq 0.375$ and $y \leq 0.335$, preferably $x \leq 0.370$ and $y \leq 0.330$. The values of (x,y) of the light guiding plate are outside the above ranges, the light guiding plate becomes yellowish and its appearance is poor. The values of (x,y) of the light guiding plate in the xy chromaticity diagram refers to an average value of measurement results obtained by measuring those three places (measurement range: diameter 10 mm) of the light guiding plate which are the farthest from a light-entering surface with a luminance meter SR3, BM7 or BM5A supplied by Topcon Corporation using a white LED as a light source.

More specifically, the values of (x,y) in the xy chromaticity diagram (also called CIE system or CIE chromaticity diagram) including brightness measurement can be determined by the following method. That is, for example, in a dark room, a light guiding plate is placed on a unit where light can be introduced into the light guiding plate through the light-entering surface of the light guiding plate and light emitted from a lamp is introduced into the light guiding plate through the light-entering surface. And, light emitted from the light guiding plate is measured for a luminance with the luminance meter provided about 35 cm above the light guiding plate. The size of measurement range can be changed by changing the distance from the light guiding plate to the luminance meter. In the brightness measurement and so on of the light guiding plate, desirably, the light guiding plate is divided as equally as possible into the number of measurement places and measured in the central portion of each of the thus-divided regions.

In the present invention including the above-explained various preferred embodiments, there can be employed a constitution in which the light guiding plate has a thin-plateshaped form with a nearly constant thickness as a whole, light enters the first side wall (light-entering surface) of the light guiding plate and the light is emitted from the first main surface and/or the second main surface. Alternatively, there may be employed a constitution in which the light guiding plate has the wedged form of truncated pyramid as a whole, the two opposed side walls of the truncated pyramid correspond to the first main surface and second main surface of the light guiding plate, the bottom surface of the truncated pyramid corresponds to the first side wall of the light guiding plate, the top surface of the truncated pyramid corresponds to the third side wall of the light guiding plate, the remaining two opposed side walls of the truncated pyramid correspond to the second side wall and fourth side wall of the light guiding plate, light enters the first side wall (light-entering surface) of the light guiding plate and the light is emitted from the first main surface and/or the second main surface. Alternatively, the light guiding plate may have a constitution in which at least 80% of the entire light guiding plate has a thin-plate-shaped form having a nearly constant thickness and the rest is gradually increased in thickness and ends as a first side wall (light-entering surface). Regarding the light guiding plate having the form of a thin plate, the thickness of the light guiding plate is expressed as being "nearly constant" as a whole. The above expression is employed to include the fluctuation of thicknesses of light guiding plates which fluctuation can be caused depending upon the fluctuation of molding conditions and so on during the production of the light guiding plates.

The "transparent thermoplastic resin" as used in the present invention refers to a thermoplastic resin having a parallel ray transmittance, measured according to Section 5.5.2 (Measurement method A) of JIS K 7105-1981, of 85% or more. In the measurement, a resin test pieces is to have a thickness of 3.0 mm.

The light guiding plate is measured for a thickness with a micrometer, and so measured at least in nine points to determine an average. Desirably, a thickness difference is determined together. In particular, there tends to be a largest thickness difference between that portion of the light guiding plate which corresponds to a cavity portion positioned in the vicinity of the molten resin injection portion (e.g., that portion of the light guiding plate which is in the vicinity of the third side wall) and that portion of the light guiding plate which corresponds to a cavity portion corresponding to the leading end of a flow (e.g., that portion of the light guiding plate which is in the vicinity of the first side wall as a light-entering surface). When the above thickness difference is determined, therefore, it is desirable to measure such portions of the light guiding plate for thicknesses to determine the thickness difference. The thickness difference of the light guiding plate having a constant thickness is desirably 80 μm or less. When the thickness difference exceeds 80 μm, the value of luminance that is actually found may be smaller than the value of luminance based on the optical design of the light guiding plate, and it is difficult to incorporate such a light guiding plate into a thin-shaped liquid crystal display unit. When such a light guiding plate is forced into the thin-shaped liquid crystal display unit, it exerts a pressure on the liquid crystal display unit and may destroy the liquid crystal display unit.

In the light guiding plate, none of the convex portions and the concave portions may be formed in the circumferential portion of the first main surface, or the circumferential portion of the first main surface may not satisfy the requirements of size and surface roughness of the convex portions or concave portions to be described later. That is, that portion of the first main surface, which does not substantially contribute to the scattering of light, may not be required to have none of the convex portions and concave portions formed therein, or may not be required to satisfy the requirements of size and surface roughness of the convex portions or concave portions.

When the light guiding plate of the present invention is used in a liquid crystal display unit, it may be incorporated into an edge-type/backlight-type surface-emitting light source apparatus and may be also incorporated into an edge-type/front-light-type surface-emitting light source apparatus. That is, these surface-emitting light source apparatuses are included in the surface-emitting light source apparatus of the present invention.

In the edge-type/backlight-type surface-emitting light source apparatus, a light source composed of a fluorescent lamp or a light-emitting diode (LED) is disposed near the first side wall of the light guiding plate. And, a reflecting member is disposed so as to face the first main surface of the light guiding plate. Further, a liquid crystal display unit is disposed so as to face the second main surface of the light guiding plate. Light that is emitted from the light source enters the light guiding plate through the first side wall of the light guiding plate and collides with the convex portions or concave portions of the first main surface to be scattered, and the light is emitted from the first main surface, reflected on the reflecting member to re-enter the first main surface and emitted from the second main surface to illuminate the liquid crystal display unit. For example, a diffusing sheet may be disposed between the liquid crystal display unit and the second main surface of the light guiding plate.

In the edge-type/front-light-type surface-emitting light source apparatus, a light source composed of a fluorescent lamp or a light-emitting diode is disposed near the first side wall of the light guiding plate as well. A liquid crystal display unit is disposed so as to face the second main surface of the light guiding plate. Light that is emitted from the light source enters the light guiding plate through the first side wall of the light guiding plate and collides with the convex portions or concave portions of the first main surface to be scattered, and the light is emitted from the second main surface, passes through the retardation film or the polarized film and passes through the liquid crystal display unit. The light emitted from the liquid crystal display unit is reflected on a reflecting member deposed outside the liquid crystal display unit, again passes through the liquid crystal display unit, passes through the retardation film or the polarized film and further passes the light guiding plate and the light is emitted from the first main surface of the light guiding plate. This light is recognized as an image and the like displayed on the liquid crystal display unit. Generally, an anti-reflection layer is formed on the second main surface of the light guiding plate.

In the surface-emitting light source apparatus of the present invention, light emitted from the light source may be introduced directly to the light guiding plate, or may be introduced indirectly to the light guiding plate. In the latter case, for example, an optical fiber can be used. The light source can be selected from artificial light sources such as a fluorescent lamp, an incandescent lamp, a light-emitting diode, a fluorescent tube and the like, or natural light such as sunlight, depending upon the constitution, structure, use and so on of the surface-emitting light source apparatus.

The height, depth, pitch and form of the convex portions or concave portions provided in the first main surface of the light guiding plate may be constant or may be changed with an increase in distance from the light source. In the latter case, for example, the pitch of the convex portions or concave portions may be decreased with an increase in distance from the light source. The pitch of the convex portions or the pitch of the concave portions means a pitch of the convex portions or a pitch of the concave portions along the direction in which light enters the light guiding plate.

In the present invention, the height of the convex portions formed in the first main surface is $5\times10^{-7}$ m to $6\times10^{-5}$ m, preferably $1\times10^{-6}$ m to $5\times10^{-5}$ m, more preferably $2\times10^{-6}$ m to $4\times10^{-5}$ m, and the pitch thereof is $5\times10^{-7}$ m to $4\times10^{-4}$ m, preferably $5\times10^{-6}$ m to $3.5\times10^{-4}$ m, more preferably $3\times10^{-5}$ m to $3.0\times10^{-4}$ m. The depth of the concave portions formed in the first main surface is $5\times10^{-7}$ m to $6\times10^{-5}$ m, preferably $1\times10^{-6}$ m to $5\times10^{-5}$ m, more preferably $2\times10^{-6}$ m to $4\times10^{-5}$ m, and the pitch thereof is $5\times10^{-7}$ m to $4\times10^{-4}$ m, preferably $5\times10^{-6}$ m to $3.5\times10^{-4}$ m, more preferably $3\times10^{-5}$ m to $3.0\times10^{-4}$ m. Desirably, at least 70%, preferably at least 80% of total number of the convex portions or concave portions formed in the first main surface satisfy a surface roughness of 0.3 μm or less, preferably 0.15 μm or less, more preferably 0.08 μm or less. The surface roughness of a flat portion between convex portions in the first main surface of the light guiding plate or the surface roughness of a flat portion between concave portions in the first main surface of the light guiding plate is not specially limited. That is, the flat portion of the first main surface of the light guiding plate may have a surface roughness $R_z$ of 0.3 μm or less, or may have a surface roughness of over 0.3 μm, or the above flat portion may be provided with microscopic valleys and hills. Alternatively, in the light guiding plate, a flat portion may not be required to exist in any portion of the first main surface of the light guiding plate between convex portions or between concave portions. That is, the light guiding plate may have a constitution in which concavo-convex portion is formed in(on) the first main surface.

The convex portions and/or concave portions formed in the first main surface of the light guiding plate may have a constitution in which they have continuous and straightly linear convex forms and/or concave forms extending in the direction having a predetermined angle with the direction in which light enters the light guiding plate. When the light guiding plate is cut with an imaginary plane that is extending in the direction in which light enters the light guiding plate and that is perpendicular to the first main surface, examples of the cross-sectional form, that the continuous and straightly linear convex forms and/or concave forms have, include a triangle; arbitrary squares including a regular square, a rectangle and a trapezoid; arbitrary polygons; and various smooth curves such as a part of a circle, a part of an ellipse, a part of a parabola and a part of a hyperbola. The above direction having a predetermined angle with the direction in which light enters the light guiding plate means the direction having an angle of 60 degrees to 120 degrees, when the direction in which light enters the light guiding plate is 0 degree. The phrase "direction having a predetermined angle with the direction in which light enters the light guiding plate" as will be used hereinafter has the same meaning.

The convex portions and/or concave portions formed in the first main surface can have a constitution in which they have discontinuous convex forms and/or concave forms arranged on an imaginary straight line having a predetermined angle with the direction in which light enters the light guiding plate. Examples of form of the above discontinuous convex forms and/or concave forms include a pyramid, a cone, a column and polygonal columns including a trigonal prism and a square column; and various smooth curves such as a part of a sphere, a part of an ellipsoid of revolution, a part of a parabola of revolution and a part of hyperbola of revolution.

When the discontinuous convex forms or concave forms have a curved surface, the surface roughness is preferably defined by surface roughness $R_r$. When the discontinuous convex forms or concave forms have some other surface or in the case of continuous convex forms or concave forms, the surface roughness is preferably defined by surface roughness $R_z$. The surface roughness $R_z$ and the surface roughness $R_r$ are defined on the basis of JIS B 0601-2001.

The second main surface of the light guiding plate is preferably a nearly flat surface, while the second main surface shall not be limited thereto. It may be a mirror surface or may have microscopic valleys and hills.

There may be employed a constitution in which a second insert block is provided inside the mold assembly for forming the second main surface of the light guiding plate. In this case, when the light guiding plate is used in a backlight-type surface-emitting light source apparatus, that surface of the second insert block which faces the cavity may be a mirror surface or a blasted surface. When the light guiding plate is used in a front-light-type surface-emitting light source apparatus, that surface of the second insert block which faces the cavity is required to be a mirror surface. When that surface of the second insert block which faces the cavity is a mirror surface, desirably, the surface roughness $R_z$ of that surface of the second insert block which faces the cavity is 0.01 μm to 0.1 μm, preferably 0.01 to 0.08 μm, more preferably 0.01 to 0.05 μm. The second insert block may be made of zirconia ceramic or may be made of zirconia ceramic or electrically conductive zirconia ceramic and have a metal layer. In the former case, it is only required that the surface roughness $R_z$ of the zirconia ceramic should satisfy the above value, and in the latter case, it is only required that the surface roughness $R_z$ of the metal layer surface should satisfy the above value. The second insert block in these constitutions will be sometimes referred to as "second insert block made of ceramic" for convenience. In some cases, the second insert block may be made of a metal. The insert block and the second insert block made of ceramic will be sometimes generically referred to as "insert block and so on"

The insert block and so on will be explained below.

The zirconia ceramic or electrically conductive zirconia ceramic for constituting the insert block body of the insert block and so on is preferably constituted of partially stabilized zirconia ceramic. When the insert block body of the insert block and so on is made of partially stabilized zirconia ceramic, the partially stabilizing agent in the partially stabilized zirconia ceramic is preferably at least one material selected from the group consisting of calcia (calcium oxide, CaO), yttrialite (yttrium oxide, $Y_2O_3$), magnesia (magnesium oxide, MgO), silica (silicon oxide, $SiO_2$) and ceria (cerium oxide, $CeO_2$). Desirably, the content of the partially stabilizing agent in the zirconia ceramic or electrically conductive zirconia ceramic is 3 mol % to 15 mol %, preferably 6 mol % to 10 mol % when the partially stabilizing agent is calcia, it is 1 mol % to 8 mol %, preferably 2 mol % to 5 mol % when the partially stabilizing agent is yttrialite, it is 4 mol % to 15 mol %, preferably 8 mol % to 10 mol % when the partially stabilizing agent is magnesia, and it is 3 mol % to 18 mol %, preferably 6 mol % to 12 mol % when the partially stabilizing agent is ceria.

In the insert block and so on, desirably, the thickness of the insert block body is 0.1 mm to 10 mm, preferably 0.5 mm to 10 mm, more preferably 1 mm to 7 mm, still more preferably 2 mm to 5 mm. When the thickness of the inert block body is less than 0.1 mm, the heat insulating effect of the insert block and so on is decreased, a molten thermoplastic resin injected into the cavity is rapidly cooled, and the convex portions or concave portions are not easily formed in the light guiding plate. Further, when the insert block and so on is fixed to the mold assembly made of a metal or an alloy, the insert block and so on can be bonded to an inside of the mold assembly with, for example, a thermosetting adhesive. When the thickness of the insert block body is less than 0.1 mm, and if the adhesive has a nonuniform thickness, a nonuniform stress remains in the insert block and so on, so that there may be caused a phenomenon in which the light guiding plate surface is undulated or that the insert block and so on may be broken due to the pressure of the molten thermoplastic resin injected into the cavity. When the thickness of the insert block body exceeds 10 mm, the heat insulating effect of the insert block and so on is too high, and the light guiding plate taken out of the mold assembly may be deformed unless the cooling of the resin in the cavity is prolonged. There may be therefore caused a problem that the molding cycle is prolonged.

Desirably, the surface roughness $R_z$ of that surface of the insert block body which faces the cavity is 0.1 μm to 10 μm, preferably 0.1 μm to 8 μm, more preferably 0.1 μm to 5 μm. When the surface roughness $R_z$ of that surface of the insert block body which faces the cavity is 0.1 μm or more, an anchor effect can be secured when the metal layer is formed on the above surface by an electroless plating method, and as a result, the metal layer can be formed on the above surface by an electroless plating method. When the surface roughness $R_z$ of that surface of the insert block body which faces the cavity exceeds 10 μm, the surface roughness of the metal layer increases, and the time period required for surface-polishing the metal layer may be increased or pin holes are liable to be formed in (through) the metal layer. That surface of the insert block body which faces the cavity can be roughened by blasting or etching.

The thermal conductivity of the zirconia ceramic, electrically conductive zirconia ceramic or partially stabilized zirconia ceramic for constituting the insert block body is 8.5 J/(m·s·K) or less [8.5 W/(m·K) or less or $2 \times 10^{-2}$ cal/(cm·s·K) or less], specifically, approximately 3.5 to 6 J/(m·s·K). When the insert block body is made of an inorganic material having a thermal conductivity of over 8.5 J/(m·s·K), the light guiding plate sometimes has an appearance equivalent only to that of a light guiding plate obtained by the use of a mold assembly made of a general carbon steel provided with no insert block, since a molten thermoplastic resin in the cavity is rapidly cooled by such an insert block and so on, depending on an injection molding condition.

Part of the cavity provided in the mold assembly is constituted of the insert block and so on and "part of the cavity is constituted" as used herein means that part of the cavity surface that defines the outer form of the light guiding plate is constituted. More specifically, the cavity is constituted, for example, of the surface (cavity surface of the mold portion) that constitutes the cavity and is formed in the first mold member or second mold member that constitutes the mold assembly, and the cavity is optionally constituted of the surface (cavity surface of the insert block) that constitutes part of the cavity and is formed on the insert block. The above phrase will be also used in this sense hereinafter. The metal layer in which the concave portions and/or convex portions are formed constitutes a cavity surface as well. The metal layer having concave portions and/or convex portions is provided on the entire cavity surface of the insert block and so on or on a predetermined site thereof. In the latter case, that cavity surface of the insert block which is other than the predetermined site may be constituted of a flat metal layer.

In the insert block and so on, the metal layer may be provided on at least the cavity surface of the insert block, or may be provided on the entire surface of the insert block body.

The required surface roughness of the surface of the concave portions and/or convex portions formed in the metal layer is desirably 0.5 μm or less although it differs between a prism-like form obtained by mirror-polishing and a dots-like form obtained by etching or machining. When at least 80%, preferably at least 90% of total number of the concave portions formed in the metal layer have a dots-like form, preferably, it is preferred to satisfy a surface roughness of 0.5 μm or less, and in the mirror-polishing, it is desirable to satisfy a surface roughness of 0.1 μm or less, preferably 0.05 μm or less, more preferably 0.01 μm or less. When the discontinuous convex forms have a curved surface, preferably, the surface roughness is defined by the surface roughness $R_r$. When the discontinuous convex forms have some other form or in the case of continuous convex forms, preferably, the surface roughness is defined by the surface roughness $R_z$.

In the above insert block and so on, the metal layer is formed of at least one material selected from the group consisting of Cr, a Cr compound, Cu, a Cu compound, Ni and an Ni compound. When the concave portions formed in the metal layer have a depth d, desirably, the thickness t (unit: m) of the metal layer satisfies $(d+5) \times 10^{-6}$ m$\leq$t$\leq 5 \times 10^{-4}$ m, preferably $(d+10) \times 10^{-6}$ m$\leq$t$\leq 1 \times 10^{-4}$ m. When the convex portions formed in the metal layer have a height h, desirably, the thickness t (unit: m) of the metal layer satisfies $(h+5) \times 10^{-6}$ m$\leq$t$\leq 5 \times 10^{-4}$ m, preferably $(d+10) \times 10^{-6}$ m$\leq$t$\leq 1 \times 10^{-4}$ m. In the above manner, the concave portions or convex portions can be formed in the metal layer by various methods, and the metal layer can be easily processed by a general cutting machine. Further, when a molten thermoplastic resin injected into the cavity comes in contact with the metal layer, the molten thermoplastic resin can be stopped from being rapidly cooled. Further, the insert block can be finely adjusted in connection with the mold portion (a portion for attaching the insert block or a core for fitting the insert block). Furthermore, high scratch resistance and a high surface hardness can be obtained. The above thickness t of the metal layer means a distance from the bottom portion of the concave portion formed in the metal layer or the tip portion of the convex portion formed there to the surface of the insert block body (or to an interface between an activate metal film to be described later and the metal layer).

In the insert block and so on, the metal layer may be constituted of one single layer or a plurality of layers. The Cr compound specifically includes a nickel-chromium alloy. The Cu compound specifically includes a copper-zinc alloy, a copper-cadmium alloy and a copper-tin alloy. Further, the Ni compound specifically includes a nickel-phosphorus alloy (Ni—P alloy), a nickel-iron alloy, a nickel-cobalt alloy, a nickel-tin alloy, a nickel-iron-phosphorus alloy (Ni—Fe—P alloy) and a nickel-cobalt-phosphorus alloy (Ni—Co—P alloy). When the metal layer is required to have high scratch resistance, for example, the metal layer is suitably constituted of chromium (Cr). When the metal layer is required to have not high scratch resistance but a thickness, for example, the metal layer is suitably constituted of copper (Cu). Further, when the metal layer is required to have scratch resistance to some extent and is also required to have a thickness, for example, the metal layer is suitably constituted of nickel (Ni). Further, the metal layer is required to have a thickness and is also required to have surface hardness, preferably, the metal layer is constituted of a two-layer structure in which, for example, the lower layer is constituted of copper (Cu) or nickel (Ni) to have a desired thickness and adjust the thickness and the upper layer is constituted of a thin chromium (Cr) layer.

The concave portions or convex portions in the metal layer of the insert block and so on can be formed by a physical method or a chemical method. The concave portions or convex portions can be formed in the metal layer by a machining process using a diamond turning tool. Further, when the concave portions or convex portions are formed by a chemical method, a resist layer is applied to the metal layer and a pattern is formed in the resist layer, for example, by irradiating the resist layer with ultraviolet layer through a predetermined mask, or a resist layer is formed by a printing method, and then, the metal layer is etched using the above resist layer as an etching mask, whereby the concave portions or convex portions can be formed in the metal layer. The formation of the resist layer and the etching may be carried out a plurality of times as required to form the concave portions or convex portions.

In the insert block and so on, the method for arranging the metal layer on the surface of the insert block body, that is, specifically, for example, the method for forming the metal layer on the surface of the insert block body, includes an electric plating method, an electroless plating method and a combination of an electroless plating method and an electric plating method. When the electric plating method is applied, it is not essential to form an activated metal film to be described later. However, it is required to employ a constitution in which that surface of the insert block body which is to face the cavity is roughened, then, electroless plating is carried out and then electric plating is carried out.

In the insert block and so on, the zirconia ceramic for constituting the insert block body refers to zirconia ceramic having no electrically conductivity, i.e., zirconia ceramic having a specific volume resistivity of over $1 \times 10^9 \Omega \cdot cm$. In the above insert block and so on, there may be employed a constitution in which the insert block body is made of zirconia ceramic and the metal layer is formed on the insert block body through an activated metal film. This constitution will be referred to as the first constitution of the insert block and so on, for convenience.

In the first constitution of the insert block and so on, the activated metal film is formed of a eutectic composition of a metal (active metal) selected from the group consisting of Ti, Zr and Be and a metal selected from the group consisting of Ni, Cu, Ag and Fe, and the thickness of the activated metal film is $1 \times 10^{-6}$ m to $5 \times 10^{-5}$ m, preferably $3 \times 10^{-6}$ m to $4 \times 10^{-5}$ m. Specific examples of the eutectic composition include Ti—Ni, Ti—Cu, Ti—Cu—Ag, Ti—Ni—Ag, Zr—Ni, Zr—Fe, Be—Cu and Be—Ni. When the activated metal film has a thickness of $1 \times 10^{-6}$ m to $5 \times 10^{-5}$ m, it has high electrically conductivity, that is, electrically non-conductive zirconia ceramic can be imparted with electric conductivity, so that the metal layer can be formed by an electric plating method.

The method for forming the activated metal film includes an active metal soldering method. When the active metal soldering method is employed, the activated metal film can have high adhesion to the surface of the insert block body. Further, the metal layer can have high adhesion to the insert block body. The above active metal soldering method refers to a method in which a paste of a metal material for constituting the active metal film is applied to the surface of the insert block body by a screen printing method and the applied paste is baked at a high temperature of 800° C. to 1000° C. in vacuum or in an inert gas atmosphere.

Alternatively, regarding the insert block and so on, there can be employed a constitution in which the insert block body is made of electrically conductive zirconia ceramic having a specific volume resistivity of $1 \times 10^9 \Omega \cdot cm$ or less, preferably $1 \times 10^4 \Omega \cdot cm$ or less. This constitution will be referred to as the second constitution of the insert block and so on, for convenience. When the specific volume resistivity of the electrically conductive zirconia ceramic exceeds $1 \times 10^9 \Omega \cdot cm$, the zirconia ceramic becomes an insulating material, so that it is difficult to form the metal layer directly on the insert block body. The lower limit value of the specific volume resistivity of the electrically conductive zirconia ceramic is desirably $1 \times 10^{-4} \Omega \cdot cm$.

In the second constitution of the insert block and so on, zirconia ceramic can be rendered electrically conductive by adding an electrically conducting agent to the zirconia ceramic. The electrically conducting agent is at least one member of $Fe_2O_3$, $NiO$, $CO_3O_4$, $Cr_2O_3$, $TiO_2$ and TiN, or it may be at least one member of carbides such as TiC, WC, TaC and the like. The content of the electrically conducting agent in the electrically conductive zirconia ceramic is desirably 10% by weight or more. When the content thereof is less than 10% by weight, it is sometimes difficult to attain a specific volume resistivity of $1 \times 10^9 \Omega \cdot cm$ or less. On the other hand, when a large amount of the electrically conducting agent is added, the specific volume resistivity of the zirconia ceramic is decreased. However, the insert block body as an obtained sintered body is impaired in strength. It is therefore desirable to limit the content thereof to 40% by weight or less.

In the second constitution of the insert block and so on, a sintering-temperature depressor in an amount of 3% by weight or less may be incorporated into the electrically conductive zirconia ceramic. When the electrically conducting agent is selected from $Fe_2O_3$, $NiO$, $CO_3O_4$, $Cr_2O_3$, $TiO_2$ or TiN, the sintering-temperature depressor can be selected from oxides of Ca, K, Na, Mg, Zn, Sc and so on, and when the electrically conducting agent is selected from carbides such as TiC, WC, TaC and so on, the sintering-temperature depressor can be selected from $Al_2O_3$ or $TiO_2$. When the sintering-temperature depressor is incorporated in an amount of 3% by weight or less, the sintering temperature can be decreased and the growth of grains of zirconia and the electrically conducting agent can be depressed, so that the insert block body can be improved in mechanical properties such as flexural strength, hardness and the like.

In the first constitution of the insert block and so on, when the active metal soldering method is employed for forming the activated metal film, the activated metal film can have high adhesion to the insert block body, and the metal layer can have high adhesion to the insert block body. In the first constitution of the insert block and so on, further, when the activated metal film is formed, the surface of the insert block body comes to have electrically conductivity, and the metal layer can be formed by an electric plating method. Alternatively, when the surface roughness of that surface of the insert block body which is to face the cavity is defined, the metal layer can be formed on the insert block body by an electroless plating method, and there can be obtained high adhesion of the metal layer to the insert block body. In the second constitution of the insert block and so on, when the insert block body is made of the electrically conductive zirconia ceramic, the metal layer can be formed directly on the surface of the insert block body. Further, since the metal layer is formed on the outermost surface of the insert block and so on, the convex portions or concave portions can be easily formed in the metal layer on that surface of the insert block body which is to face the cavity, by various processing methods, and there can be attained high scratch resistance and high surface hardness. Further, when fine cracks that would occur in a circumferential portion of the insert block body during the processing of the insert block body are covered with the metal layer, such cracks never come in contact with the molten thermoplastic resin, so that the insert block and so on would not be easily broken.

For preventing the breaking of the insert block and so on which breaking would take place when fine cracks occurring in an edge portion of the insert block body come in contact with the molten thermoplastic resin, it is preferred, in some cases, to polish the edge portion of the insert block body by a diamond whetstone so that no stress is concentrated thereon. Alternatively, it is preferred in some cases to provide a curvature surface having a radius of 0.3 mm or less or a C-face cut so that the concentration of a stress on the edge portion may be avoided.

In the insert block and so on, as a method for providing the metal layer on the surface of the insert block body, alternatively, there is a method in which a removably attachable metal layer (metal film) is arranged on the insert block body made of zirconia ceramic and it is replaceable. As a method for producing the removably attachable metal layer (metal film), there is a method in which a removably attachable metal layer is formed by an electrocasting method using a mother matrix having concavo-convex portions that are formed from a photoresist on a glass surface. When the metal layer (metal film) is removably provided on the insert block body, it is preferred either to employ a constitution in which the metal layer (metal film) is fixed to the insert block body by vacuum suction around the insert block body or to press the metal layer down together with a circumferential portion of the insert block body by means of other metal block, for stopping the metal layer (metal film) from moving due to the flow of the molten thermoplastic resin injected into the cavity during molding. However, the method of removably providing the metal layer shall not be limited thereto, and the metal layer (metal film) may be simply placed on the insert block body.

In some cases, the insert block body may be made of a metal, and a zirconia ceramic layer may be formed on the insert block body made of a metal. As a method for forming the zirconia ceramic layer, a flame spray coating method can be employed. That is, it is a method in which powder of the above-described zirconia composition is sprayed to the insert block body made of a metal at a high temperature with a spray gun, and it includes an arc spraying method and a plasma spraying method. When the zirconia composition is sprayed, a plasma spraying method capable of generating a high temperature is effective since the zirconia composition has a high melting point. The thickness of the zirconia ceramic layer is preferably 0.5 mm to 2 mm. When it is too large, the zirconia ceramic layer may be broken due to a strain. For improving the adhesion between the insert block body made of a metal and the zirconia ceramic layer, preferably, the zirconia composition is spray-coated after metals such as Ni—Cr are spray-coated. For arranging the metal layer on the surface of the thus-obtained zirconia ceramic layer, the above-described method can be employed.

The light guiding plate of the present invention or the light guiding plate for constituting the surface-emitting light source apparatus of the present invention is preferably manufactured (molded) by the process for manufacturing a light guiding plate of the present invention. For some specifications of a light guiding plate, however, there may be employed an injection-molding method that is generally used for molding a thermoplastic resin. That is, there can be employed a method in which a first mold member and a second mold member, which constitutes a mold assembly, are clamped, a molten thermoplastic resin is injected into a cavity from a molten resin injection portion, then, the transparent resin in the cavity is cooled to solidness, then the first mold member and the second mold member are opened and the light guiding plate is taken out of the mold assembly. Alternatively, there may be also employed a method (injection compression-molding method) in which a mold assembly is structured so as to vary its cavity volume, a first mold member and a second mold member are clamped to ensure that the cavity has a volume ($V_C$) greater than the volume ($V_M$) of the light guiding plate to be formed, a molten thermoplastic resin is injected into the cavity (volume: $V_C$), and the volume of the cavity is decreased to the volume (volume: $V_M$) of the light guiding plate to be formed, before or simultaneously with the start of injection of the molten thermoplastic resin, during the injection thereof or after completion of the injection. The volume of the cavity may come to be the volume ($V_M$) of the light guiding plate to be formed, during the injection of the molten thermoplastic resin or after completion of the injection thereof (including a point of time simultaneous with completion of the injection). The structure of the above mold assembly includes a structure in which the first mold member and the second mold member form a telescopic structure and a structure in which the mold assembly has a core that is movable in the cavity so as to render the cavity volume variable. The movement of the core can be controlled, for example, by a hydraulic cylinder.

The molten resin injection portion includes, for example, a side gate structure, a tab gate structure and a film gate structure. The molten resin injection portion may be opened to the cavity in the cavity surface that corresponds to one of the side walls of the light guiding plate. It may be opened to the cavity in the cavity surface that corresponds to the first side wall as a surface which light enters or the third side wall opposed to the first side wall as a surface which light enters. In some cases, it may be opened to the cavity in the cavity surface that corresponds to the second side wall or the fourth side wall.

EFFECT OF THE INVENTION

In the light guiding plate or surface-emitting light source apparatus of the present invention, the convex portions and/or concave portions are formed in the surface portion of the light guiding plate, the light guiding plate has a longitudinal-direction length, which is a length from the first side wall to the third side wall of 40 mm or more but 130 mm or less and at least 80% region of the light guiding plate has a thickness of 0.1 mm or more but 0.55 mm or less, so that the light guiding plate can be reliably incorporated into a liquid crystal display unit even when the thickness of the liquid crystal display unit is further decreased. Further, since it is defined that the flatness of the light guiding plate is 200 µm or less, there can be overcome the problem that the light guiding plate apparently undulates or that the average luminance value and luminance proportionality value of the light guiding plate are decreased.

In the process for manufacturing a light guiding plate of the present invention, the clamping force is adjusted to 0.5 $F_0$ or less after an elapses of t second(s) from completion of the step of injecting a molten thermoplastic resin into the cavity or after an elapse of t second(s) from completion of the dwelling step that follows the step of injecting a molten thermoplastic resin into the cavity (provided that 0 second$\leq$t$\leq$8.0 seconds), so that the strain caused during the cooling of the thermoplastic resin in the cavity or the strain caused by the shrinkage thereof can be decreased. Therefore, a strain inside the light guiding plate is decreased, the light guiding plate is free from the occurrence of distortion or swelling and the light guiding plate has high flatness. The process for manufacturing a light guiding plate of the present invention can be accomplished by modifying the software that controls the operation of an injection-molding machine.

BRIEF DESCRIPTION OF THE DRAWINGS

FIGS. 6(A) and 6(B) are schematic perspective views of the variants of the light guiding plates shown in FIGS. 4(D) and 4(E), respectively.

FIGS. 10(A) and 10(B) are schematic cross-sectional view of the variant of the mold assembly shown in FIG. 9 in an open state and a schematic enlarged cross-sectional view of the variant of the insert block shown in FIG. 9, respectively.

Figure 1A:
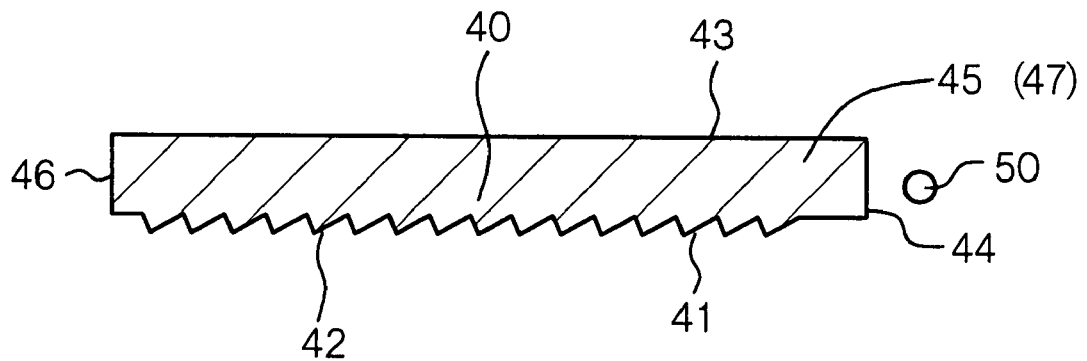
FIG. 1(A) is a schematic cross-sectional view of a light guiding plate and a surface-emitting light source apparatus.

EXPLANATION OF SYMBOLS 10, 110 . . . first mold member (movable mold member)
11 . . . insert block attaching member
12, 15 . . . engagement member
13, 113 . . . second mold member (fixed mold member)
14 . . . second insert block attaching member
16, 17, 116, 117 . . . bolt
18, 118 . . . cavity
19 . . . molten resin injection portion
111 . . . covering plate
114 . . . second covering plate
20, 120 . . . insert block
20A, 120A . . . cavity surface of insert block
21, 121 . . . insert block body
22, 122 . . . metal layer
23, 123 . . . groove
30, 130 . . . second insert block
40, 40A, 40B, 40C, 40D, 40E, 140A, 140B, 140C, 140D . . . light guiding plate
41, 141 . . . first main surface
42, 42A, 42B, 42C, 42D, 42E, 142A, 142B, 142C, 142D . . . concavo-convex portions, convex portions or concave portions
43, 143 . . . second main surface
44, 144 . . . first side wall
45, 145 . . . second side wall
46, 146 . . . third side wall
47, 147 . . . fourth side wall
50 . . . light source
51 . . . reflecting member
52 . . . diffusing sheet
53 . . . retardation film
54 . . . reflection member
55 . . . prism sheet
60 . . . liquid crystal display unit
200 . . . injection cylinder
201 . . . screw
210 . . . fixed platen
211 . . . movable platen
212 . . . tie-bar
213 . . . clamping hydraulic cylinder
214 . . . hydraulic piston

DETAILED DESCRIPTION OF THE INVENTION

The present invention will be explained below on the basis of Examples with reference to the drawings.

EXAMPLE 1

Figure 3A:
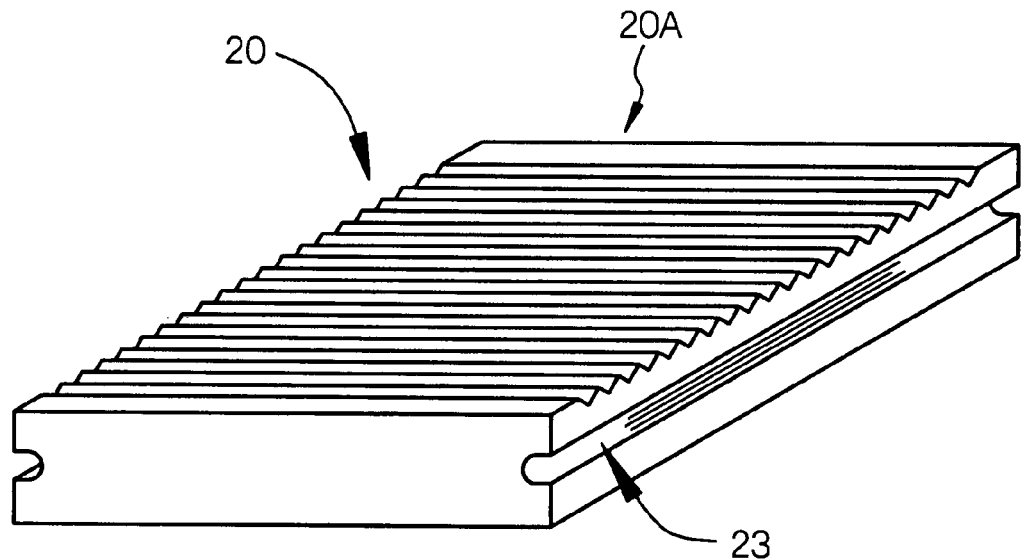
FIG. 3(A) is a schematic perspective view of an insert block.
Figure 3B:
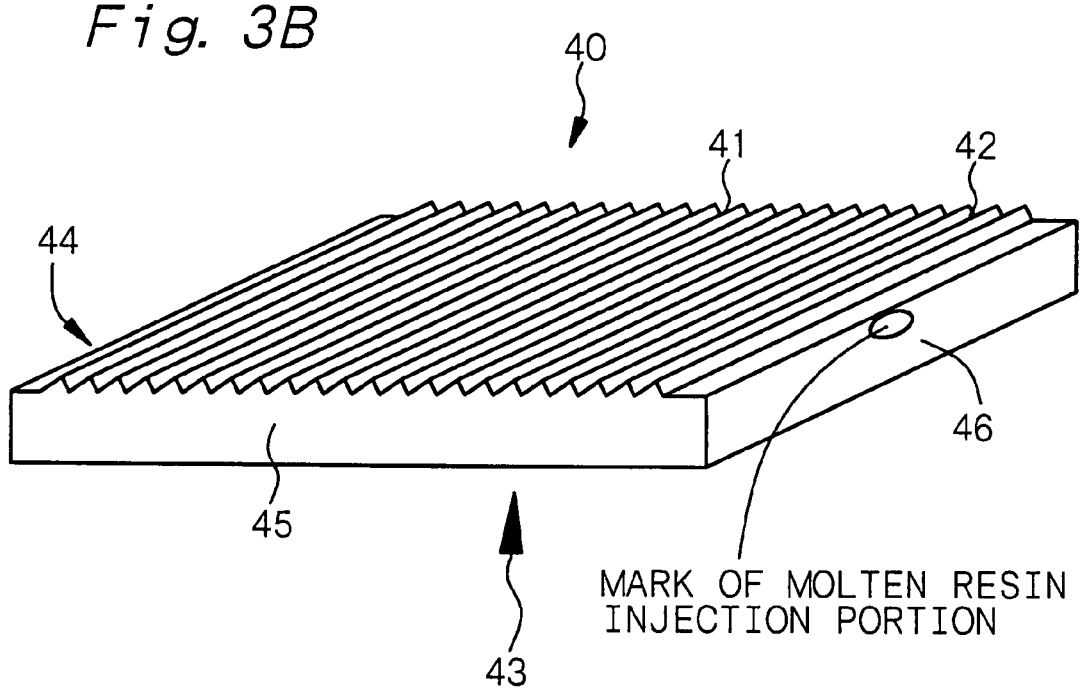
FIG. 3(B) is a schematic perspective view of a light guiding plate in Example 1.

Example 1 relates to the light guiding plate and the surface-emitting light source apparatus of the present invention. FIG. 1(A) shows a schematic cross-sectional view of a light guiding plate 40 and a surface-emitting light source apparatus in Example 1. FIG. 3(B) shows a schematic perspective view of the light guiding plate 40 of Example 1.

The nominal 2.3 inch light guiding plate 40 of Example 1 is made of a transparent thermoplastic resin and has a first main surface 41, a second main surface 43 opposed to the first main surface 41, a first side wall 44, a second side wall 45, a third side wall 46 opposed to the first side wall 44 and a fourth side wall 47 opposed to the second side wall 45. And, concavo-convex portions 42 are formed in the surface portion of the first main surface 41. The light guiding plate 40 as a whole has the form of a thin plate having a constant thickness. Light enters the light guiding plate 40 through the first side wall 44 and is emitted from the first main surface 41 and the second main surface 43.

In Example 1, the surface portion of the first main surface 41 is provided with the concavo-convex portions 42 having a height of 10 μm and a pitch of 50 μm. The concavo-convex portions 42 formed in the surface portion of the first main surface 41 have continuous and straightly linear concave and convex forms extending in the direction (specifically, in nearly perpendicular direction) having a predetermined angle with the direction (sometimes shown by an outlined arrow in some Figures) in which light enters the light guiding plate 40. That is, when the light guiding plate 40 is cut with an imaginary plane that is in the direction in which light enters the light guiding plate 40 and that is perpendicular to the first main surface 41, the cross-sectional form of the concavo-convex portion 42 is the form of sawteeth (cross-sectional form:

triangular). In other words, in the light guiding plate 40 of Example 1, no flat portion exists in that portion of the first main surface 41 of the light guiding plate 40 which is positioned between the concavo-convex portion 42 and the concavo-convex portion 42.

Figure 1B:
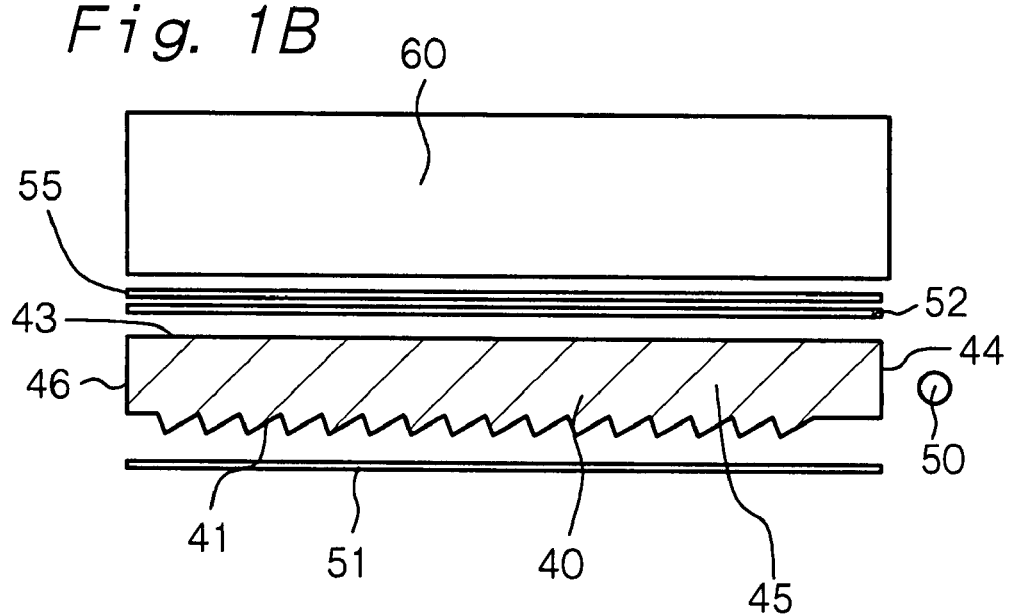
FIGS. 1(B) and 1(C) are a conceptual view of a conventional backlight-type surface-emitting light source apparatus and a conceptual view of a front-light-type surface-emitting light source apparatus, respectively.

In the backlight-type surface-emitting light source apparatus in a liquid crystal display unit, the light guiding plate 40 is arranged such that the second main surface 43 faces a liquid crystal display unit 60 as is shown in the schematic cross-sectional view of FIG. 1(B). Light that is emitted from a light source 50 and enters the light guiding plate 40 through the first side wall 44 is divided into light that is reflected on the first main surface 41 and emitted from the second main surface 43 and light that passes through the first main surface 41. The light that passes through the first main surface 41 is reflected on a reflecting member 51 disposed in a position opposed to the first main surface 41, re-enters the light guiding plate 40 and is emitted from the second main surface 43. The light that is emitted from the second main surface 43 is introduced into the liquid crystal display unit 60 disposed so as to face the second main surface 43. Between the liquid crystal display unit 60 and the second main surface 43 of the light guiding plate 40 are disposed one diffusing sheet 52 and one prism sheet 55, which uniformly scatter the light. Convex portions (not shown) having continuous convex forms, formed in the surface of the prism sheet 55, is extending in the direction nearly in parallel with the direction in which the light enters the light guiding plate 40.

Figure 1C:
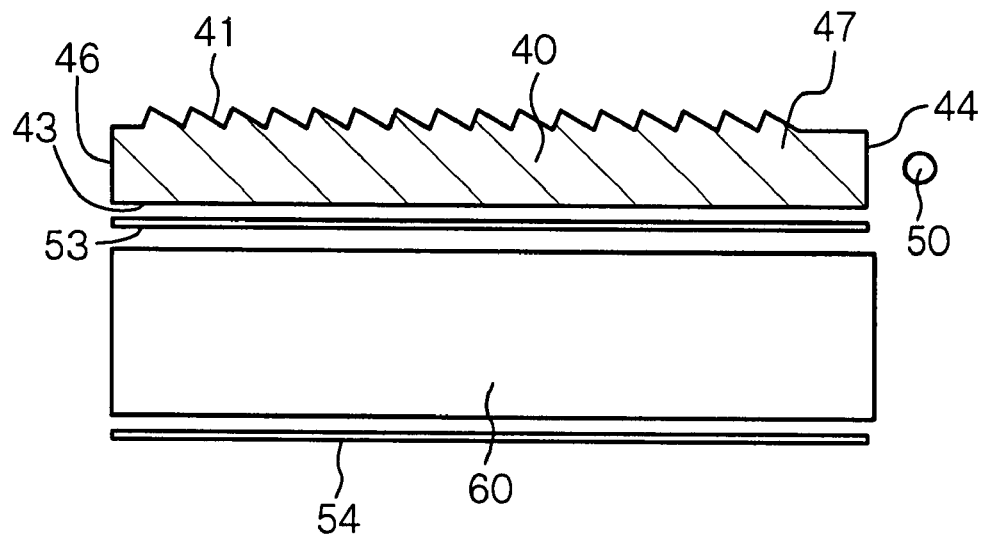

Further, in a front-light-type surface-emitting light source apparatus in a liquid crystal display unit, the light guiding plate 40 is disposed such that the second main surface 43 faces a liquid crystal display unit 60 as is shown in the conceptual view of FIG. 1(C). And, light that is emitted from the light source 50 and enters the light guiding plate 40 through the first side wall 44 is reflected on the first main surface 41 and emitted from the second main surface 43. And, the light is transmitted through the liquid crystal display unit 60 disposed in a position facing the second main surface 43, is reflected on a reflecting member 54 and is caused to pass through the liquid crystal display unit 60 again. The above light further passes through a retardation film 53 and an anti-reflection layer (not shown) formed in the second main surface 43 of the light guiding plate 40, is emitted from the first main surface 41 of the light guiding plate 40 and is recognized as an image.

Figure 2A:
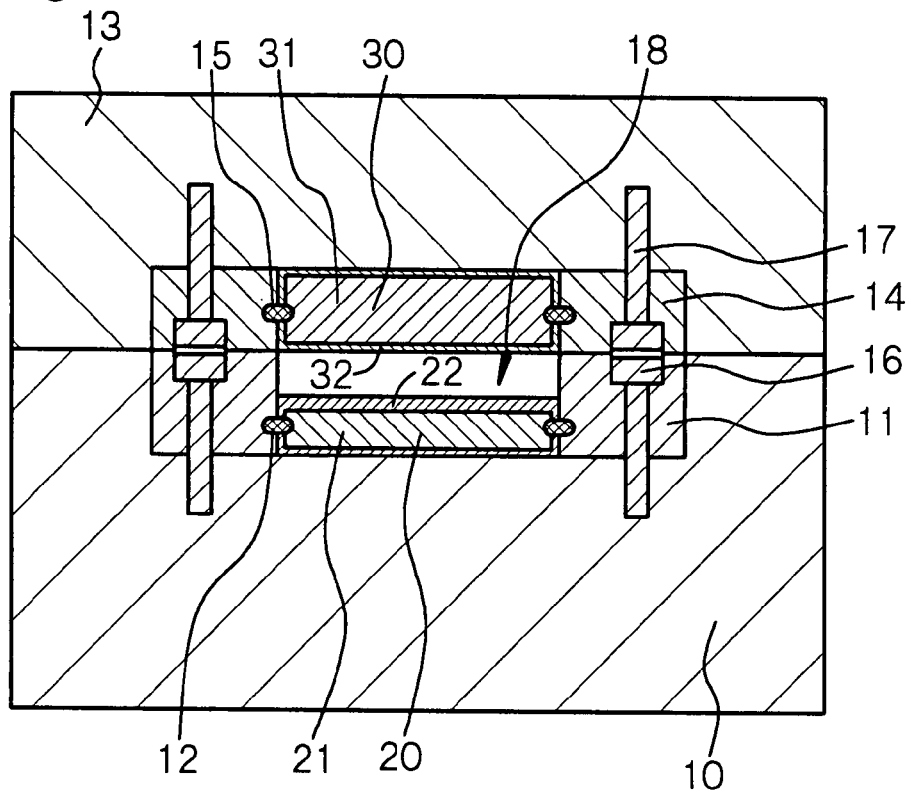
FIG. 2(A) is a schematic end view of a mold assembly viewed in the direction perpendicular to the flowing direction of a molten thermoplastic resin injected into a cavity.
Figure 2B:
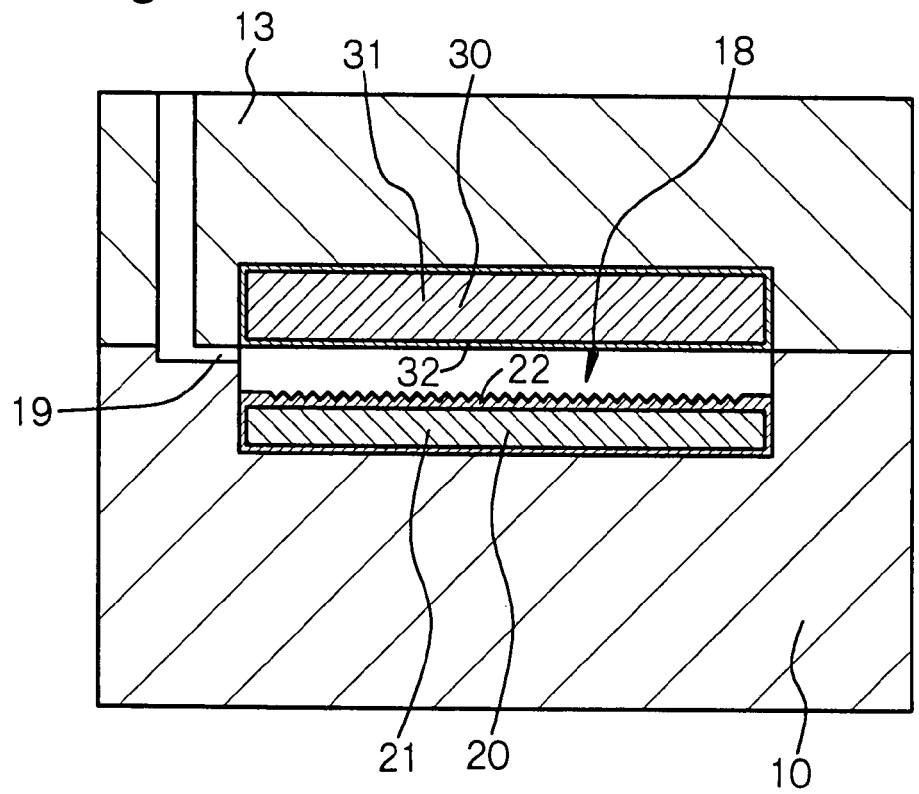
FIG. 2(B) is a schematic end view of the mold assembly viewed in the flowing direction of a molten thermoplastic resin injected into the cavity.

In Example 1 and Examples 2 to 5 to be described later, the light guiding plate is manufactured with a mold assembly having a cavity 18 and a molten resin injection portion 19 (having a side gate structure) for injecting a molten thermoplastic resin into the cavity from a cavity surface corresponding to the third side wall 46 of the light guiding plate 40, as is schematically shown in FIGS. 2(A) and 2(B). More specifically, the above mold assembly has a first mold member (movable mold member) 10 and a second mold member (fixed mold member) 13 and forms the cavity 18 by claming the first mold member 10 and the second mold member 13. FIG. 2(B) is a schematic end view along the flow direction of a molten thermoplastic resin injected into the cavity 18. In FIG. 2(B), the left hand side of the cavity 18 corresponds to a portion for forming the third side wall 46 of the light guiding plate 40 and the right hand side of the cavity 18 corresponds to a portion for forming the first side wall 44 of the light guiding plate 40. FIG. 2(A) is a schematic end view along the direction perpendicular to the flow direction of a molten thermoplastic resin injected into the cavity 18. In FIG. 2(A), the left hand side of the cavity 18 corresponds to a portion for forming the fourth side wall 47 of the light guiding plate 40 and the right hand side of the cavity 18 corresponds to a portion for forming the second side wall 45 of the light guiding plate 40.

Figure 12:
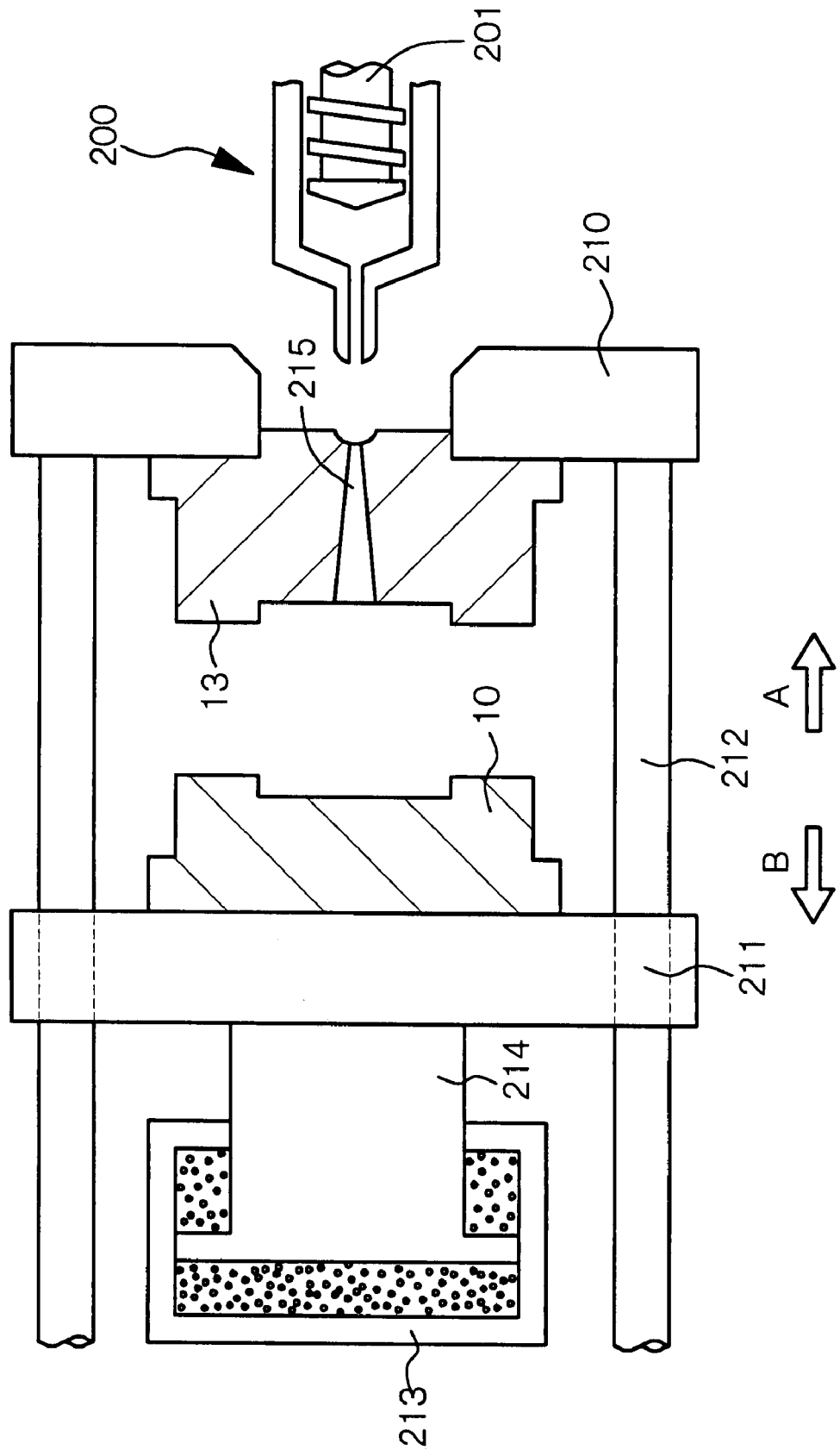
FIG. 12 is a conceptual view of an injection-molding machine suitable for practicing Examples 1 to 5.

As is conceptually shown in FIG. 12, an injection molding machine has an injection cylinder 200 that internally has a screw 210 for feeding a molten thermoplastic resin, a fixed platen 210, a movable platen 211, a tie-bar 212, a clamping hydraulic cylinder 213 and a hydraulic piston 214. The movable platen 211 is movable in parallel on the tie-bar 212 by operation of the hydraulic piston 214 in the clamping hydraulic cylinder 213. The second mold member (fixed mold member) 13 is attached to the fixed platen 210, and the first mold member (movable mold member) 10 is attached to the movable platen 211. The movable platen 211 moves in the direction of arrow "A" in FIG. 12, whereby the first mold member (movable mold member) 10 comes to be engaged with the second mold member (fixed mold member) 13, and the second mold member (fixed mold member) 13 and the first mold member (movable mold member) 10 are clamped with a clamping force $F_0$ to form the cavity 18. The clamping force $F_0$ is controlled with the clamping hydraulic cylinder 213. For example, in the process for manufacturing a light guiding plate of the present invention, the clamping force $F_0$ is decreased to $F_1$ on the basis of the control with the clamping hydraulic cylinder 213. Further, the first mold member (movable mold member) 10 moves in the direction of arrow "B" in FIG. 12, whereby the first mold member (movable mold member) 10 comes out of the engagement with the second mold member (fixed mold member) 13, and the first mold member (movable mold member) 10 and the second mold member (fixed mold member) 13 are unclamped.

Regarding the mold assembly in Example 1, there inside the mold assembly is arranged an insert block 20 having an insert block body 21 made of zirconia ceramic and a metal layer 22 that is arranged on that surface of the insert block body which faces the cavity 18 and that is provided with convexo-concave portions for forming concavo-convex portions 42 in the first main surface 41 of the light guiding plate 40. FIG. 3(A) shows a schematic perspective view of the insert block 20. Further, a second insert block 30 having the same structure as that of the insert block 20 is also arranged inside the mold assembly. The second insert block 30 specifically has an insert block body 31 made of zirconia ceramic and a metal layer 32 (provided with no convexo-concave portion) that is formed on that surface of the insert block body 31 which faces the cavity 18, for forming the second main surface 43 of the light guiding plate 40. The insert block 20 and the second insert block 30 constitute part of the cavity 18 provided in the mold assembly. The insert block 20 is attached to an insert block attaching member 11, and the insert block attaching member 11 is fixed to the first mold member 10 with bolts 16. The second insert block 30 is attached to a second insert block attaching member 14, and the second insert block member 14 is fixed to the second mold member 13 with bolts 17.

As a specific method for attaching the insert block 20 to the insert block attaching member 11, there can be employed a method in which grooves 23 are formed on opposed two side walls of the insert block 20, groves are also formed in those portions of the insert block attaching member 11 which face the above grooves 23, and an engagement member 12 made of a soft material such as copper, brass, rubber or the like is arranged in the grooves. As a specific method for attaching the second insert block 30 to the insert block attaching member 14, there can be similarly employed a method in which grooves are formed on opposed two side walls of the second insert block 30, groves are also formed in those portions of the second insert block attaching member 14 which face the above grooves, and an engagement member 15 made of a soft material such as copper, brass, rubber or the like is arranged in the grooves. When the above attaching methods are employed, the occurrence of damage to edge portions of the insert block 20 and the second insert block 30 can be reliably prevented.

The insert block 20 is for forming the first main surface 41 of the light guiding plate 40, and comprises the insert block body 21 and the metal layer 22. The insert block body 21 is made of partially stabilized zirconia ceramic (partially stabilized zirconium oxide, $ZrO_2$) containing yttrialite ($Y_2O_3$) as a partially stabilizing agent and has a thickness of 5.0 mm. The metal layer 22 is formed on that surface of the insert block body 21 which faces the cavity 18 for forming the concavo-convex portions 42 of the light guiding plate 40. The content of the partially stabilizing agent in the partially stabilized zirconia ceramic having the composition of $ZrO_2$—$Y_2O_3$ is 3 mol %. The partially stabilized zirconia ceramic has a thermal conductivity of approximately 3.8 J/(m·s·K). The sawteeth (prism)-shaped concavo-convex portions formed in the metal layer 22 have a depth d of 10 μm and a pitch P of 50 μm and have the form of sawteeth (cross-sectional form: triangle). The concavo-convex portions formed in the metal layer 22 have a continuous straightly linear concavo-convex form extending along the direction having a predetermined angle (specifically, the direction nearly at right angles) with the direction in which light enters the light guiding plate, and further it has a form complementary to the concavo-convex portions 42 formed in the first main surface 41 of the light guiding plate 40. The portion having the above concavo-convex portions formed therein corresponds to the cavity surface 20A of the insert block 20. The surface of the concavo-convex portions formed in the metal layer 22 (specifically, the entire surface of the concavo-convex portions) have a surface roughness $R_z$ of 0.2 μm or less (specifically, $R_z$=0.01 μm on average).

The metal layer 22 is formed of two layers or a 5 μm thickness Ni layer formed by an electric plating method and a 100 μm thick Ni compound layer (Ni—P layer formed by an electroless plating method) formed thereon. That is, the metal layer 22 has a thickness t of 105 μm. The metal layer 22 is shown as a single layer in the drawings. That surface of the insert block body 21 which faces the cavity 18 has a surface roughness $R_z$ of 0.5 μm. Between the insert block body 21 and the metal layer 22 is formed a 10 μm thick activated metal film (not shown), which is formed of a Ti—Cu—Ag eutectic composition. The activated metal film is formed by an active metal soldering method.

Specifically, the insert block body 21 was produced by press-molding a mixture of a zirconia ($ZrO_2$) powder with a $Y_2O_3$ powder and calcining the resultant press-molded product. Then, that surface of the insert block body 21 which was to face the cavity 18 was polished and finished using a diamond whetstone, so that the surface had a surface roughness $R_z$ of 0.5 μm. Then, the activated metal film was formed on the entire surface of the insert block body 21 by an active metal soldering method. Specifically, a paste containing a Ti—Cu—Ag eutectic composition was applied to the entire surface of the insert block body 21 and the applied paste was baked in a vacuum at a high temperature of approximately 800° C. to form the activated metal film. Then, the nickel layer was formed on the activated metal film by an electric plating method, and the Ni—P layer was formed further thereon by an electroless plating method. Then, the Ni—P layer was machined with a diamond turning tool having sawteeth (prism)-shaped concavo-convex portions to form concavo-convex portions in the metal layer 22.

The second insert block 30 can be produced in the same manner as in the production of the insert block 20 except that the concavo-convex portions were not formed in the metal layer 32. The metal layer 32 has a surface roughness $R_z$ of 0.01 μm.

On the other hand, the first mold member (movable mold member) 10 and the second mold member (fixed mold member) 13 were produced from carbons steel S55C and cut to form insert block attaching portions. And, the insert block 20 and the second insert block 30 were attached to the insert block attaching portions according to the above-explained methods.

The thus-produced first mold member (movable mold member) 10 and second mold member (fixed mold member) 13 were assembled to obtain a mold assembly in Example 1. The completed mold assembly was attached to a molding machine and then the mold assembly was heated to 130° C. and then rapidly cooled to 40° C. with a mold temperature adjusting unit. In this case, the insert block 20 and the second insert block 30 were free from damages such as breaking and the like. Further, the metal layers 22 and 32 did not suffer any damage.

A TR100EH2 injection molding machine supplied by Sodick Plustech Co., Ltd. was used as a molding machine. As a transparent resin, an aromatic polycarbonate resin having a viscosity average molecular weight and a Q value shown in Table 1 was used and injection-molded. Molding conditions such as a resin temperature, a mold temperature and a resin injection speed were set as shown in Table 1. The first mold member 10 and the second mold member 13 were clamped to bring them into a state shown in FIGS. 2(A) and 2(B), and then the transparent thermoplastic resin, which was measured and melted in the injection cylinder 200, was injected into the cavity 18 through the molten resin injection portion 19 (having a side gate structure). After the molten polycarbonate resin in a predetermined amount (amount for completely filling the cavity 18) was injected into the cavity 18 through the molten resin injection portion 19, the polycarbonate resin in the cavity 18 was cooled to solidness. After 30 seconds, the mold assembly was opened and the light guiding plate 40 was taken out of the mold assembly. In Examples 1 to 4 and Comparative Examples 1 to 3, light guiding plates were produced by a conventional injection-molding method. That is, the clamping force was maintained at the value of $F_0$ from a time when after the first mold member 10 and the second mold member 13 were clamped to a time when the mold assembly was opened. In this case, there was employed $$F_0 = 4.9 \times 10^5 (N)(=50 \text{ ton} \cdot f)$$

Further, the holding pressure and dwelling time period were set as follows.

Holding pressure=$70 \times 10^6$ Pa

Dwelling time period=1.5 seconds

Table 1 shows a longitudinal-direction length $L_L$, which is a length from the first side wall 44 to the third side wall 46 of the light guiding plate 40, a length $L_S$ of the light guiding plate 40, which is a length in the direction at right angles with the longitudinal direction, an average thickness, a thickness difference, a flatness, (x,y) values, and an average luminance value of the obtained light guiding plate 40.

The brightness measurement was carried out with BM5A supplied by TOPCON CORPORATION in nine places in a measurement range having a diameter of 10 mm. The measurement range having a diameter of 10 mm included three places in that portion of the light guiding plate 40 which corresponded to the vicinity of the molten resin injection portion, three places in the central portion of the light guiding plate and three places in the vicinity of an end portion of the light guiding plate, totaling 9 places.

Further, the surface of the concavo-convex portions 42 (more specifically, the surface of the entire concavo-convex portions) formed in the surface portion of the first main surface 41 was measured for a surface roughness $R_z$ with a surface roughness and form measuring apparatus, FORM TALYSURF, to show that the entire concavo-convex portions (more specifically, the surface of the entire concavo-convex portions) had an $R_z$ of 0.3 µm or less. Specifically, the concavo-convex portions 42 formed in the surface portion of the first main surface 41 in the vicinity of the first side wall 44 had an $R_z$ of approximately 0.01 µm, and the concavo-convex portions 42 formed in the surface portion of the first main surface 41 in the vicinity of the third side wall 45 had an $R_z$ of approximately 0.02 µm.

In spite of a very small thickness of 0.27 mm that the cavity had and a large longitudinal-direction length $L_L$ of 52 mm that the light guiding plate 40 had, the cavity 18 was fully filled with the thermoplastic resin and the light guiding plate 40 having a desired form could be formed owing to the use of the aromatic polycarbonate resin having the predetermined properties (viscosity average molecular weight and Q value) and the molding thereof under the predetermined conditions (resin temperature, mold temperature and resin injection speed). Further, the average thickness, thickness difference, flatness, (x,y) values and average luminance of the light guiding plate were also in the predetermined ranges.

EXAMPLE 2

Example 2 is a variant of Example 1. Example 2 used the same mold assembly, the same insert block and so on (different in dimensions) and the same molding machines as those used in Example 1. Example 2 differs from Example in the following four points.

(1) Example 2 used an aromatic polycarbonate resin having a lower viscosity average molecular weight and a higher Q value than the aromatic polycarbonate resin used in Example 1.
(2) The resin temperature was increased by 10° C. or set at 340° C.
(3) The resin injection speed was decreased by 300 mm·second$^{-1}$ or set at 1200 mm·second$^{-1}$, and the injection rate differed.
(4) The nominal dimension of the light guiding plate 40 was changed to 2.6 inches.

Table 1 shows a longitudinal-direction length $L_L$, a length $L_S$ in the direction at right angles with the longitudinal direction, an average thickness, a thickness difference, a flatness, (x,y) values, and an average luminance value of the obtained light guiding plate 40.

In Example 2, in spite of a very small thickness of 0.27 mm that the cavity had and a larger longitudinal-direction length $L_L$ of 58 mm that the light guiding plate 40 had, the cavity 18 was fully filled with the thermoplastic resin and the light guiding plate 40 having a desired form could be formed owing to the use of the aromatic polycarbonate resin having the predetermined properties (viscosity average molecular weight and Q value) and the molding thereof under the predetermined conditions (resin temperature, mold temperature and resin injection speed). Further, the average thickness, thickness difference, flatness, (x,y) values and average luminance of the light guiding plate were also in the predetermined ranges.

EXAMPLE 3

Example 3 is also a variant of Example 1. Example 3 used a mold assembly, an insert block and so on (different in dimensions) and a molding machine having the same structures as those used in Example 1. Example 3 differs from Example in the following five points.

(1) Example 3 used an aromatic polycarbonate resin having a lower viscosity average molecular weight and a higher Q value than the aromatic polycarbonate resin used in Example 1.
(2) The resin temperature was increased by 10° C. or set at 340° C.
(3) The resin injection speed was decreased by 1200 mm·second$^{-1}$ or set at 300 mm·second$^{-1}$, and the injection rate differed.
(4) The nominal dimension of the light guiding plate 40 was changed to 3.0 inches.
(5) The thickness of the cavity 18 was changed to 0.37 mm.

Table 1 shows a longitudinal-direction length $L_L$, a length $L_S$ in the direction at right angles with the longitudinal direction, an average thickness, a thickness difference, a flatness, (x,y) values, and an average luminance value of the obtained light guiding plate 40.

In Example 3, in spite of a very small thickness of 0.37 mm that the cavity had and a still larger longitudinal-direction length $L_L$ of 64 mm that the light guiding plate 40 had, the cavity 18 was fully filled with the thermoplastic resin and the light guiding plate 40 having a desired form could be formed owing to the use of the aromatic polycarbonate resin having the predetermined properties (viscosity average molecular weight and Q value) and the molding thereof under the predetermined conditions (resin temperature, mold temperature and resin injection speed). Further, the average thickness, thickness difference, flatness, (x,y) values and average luminance of the light guiding plate were also in the predetermined ranges.

EXAMPLE 4

Example 4 is also a variant of Example 1. Example 4 used a mold assembly and a molding machine having the same structures as those used in Example 1. Example 4 differs from Example in the following four points.

(1) The insert block and the second insert block were made of steel.
(2) The resin temperature was increased by 20° C. or set at 350° C.
(3) The resin injection speed was decreased by 800 mm·second$^{-1}$ or set at 700 mm·second$^{-1}$, and the injection rate differed.
(4) The nominal dimension of the light guiding plate 40 was changed to 2.0 inches.

Table 1 shows a longitudinal-direction length $L_L$, a length $L_S$ in the direction at right angles with the longitudinal direction, an average thickness, a thickness difference, a flatness, (x,y) values, and an average luminance value of the obtained light guiding plate 40.

In Example 4, in spite of a very small thickness of 0.27 mm that the cavity had and the steel which the insert block and the second insert block were made of, the cavity 18 was fully filled with the thermoplastic resin and the light guiding plate 40 having a desired form could be formed owing to the use of the aromatic polycarbonate resin having the predetermined properties (viscosity average molecular weight and Q value) and the molding thereof under the predetermined conditions (resin temperature, mold temperature and resin injection speed). Further, the average thickness, thickness difference, flatness, (x,y) values and average luminance of the light guiding plate were also in the predetermined ranges.

For comparison, Comparative Examples 1 to 3 shown in Table 2 were carried out.

Comparative Example 1 used a mold assembly and a molding machine having the same structures as those used in Example 1. Comparative Example 1 differs from Example in the following three points.
(1) The insert block and the second insert block were made of steel.
(2) There was used an aromatic polycarbonate resin having a higher viscosity average molecular weight and a lower Q value than those of the aromatic polycarbonate resin in Example 1.
(3) The resin temperature was increased by 20° C. or set at 350° C.

Comparative Example 2 also used a mold assembly and a molding machine having the same structures as those used in Example 1. Comparative Example 2 differs from Example in the following four points.
(1) The insert block and the second insert block were made of steel;
(2) There was used an aromatic polycarbonate resin having a higher viscosity average molecular weight and a lower Q value than those of the aromatic polycarbonate resin in Example 1.
(3) The resin temperature was increased by 40° C. or set at 370° C.
(4) The resin injection speed was decreased by 300 mm·second$^{-1}$ or set at 1200 mm·second$^{-1}$, and the injection rate differed.

Further, Comparative Example 3 also used a mold assembly and a molding machine having the same structures as those used in Example 1. Comparative Example 3 differs from Example in the following three points.
(1) There was used an aromatic polycarbonate resin having a higher viscosity average molecular weight and a lower Q value than those of the aromatic polycarbonate resin in Example 1.
(2) The resin temperature was increased by 20° C. or set at 350° C.
(3) The resin injection speed was decreased by 800 mm·second$^{-1}$ or set at 700 mm·second$^{-1}$, and the injection rate differed.

Table 2 shows longitudinal-direction lengths $L_L$, lengths $L_S$ in the direction at right angles with the longitudinal direction, average thicknesses, thickness differences, flatnesses, (x,y) values and average luminance values of light guiding plates obtained in Comparative Examples 1 to 3.

In Comparative Example 1, the thermoplastic resin had a low Q value (that is, the molten thermoplastic resin had a high viscosity), and the use of a combination of the insert block and the second insert block made of steel each was not sufficient for filling the cavity with the molten thermoplastic resin.

In Comparative Example 2, while the thermoplastic resin had a low Q value (that is, the thermoplastic resin had a high viscosity), the resin temperature was set at 370° C., so that the cavity could be filled with the molten thermoplastic resin. However, the obtained light guiding plate had a poor flatness value and also had a low average luminance value.

In Comparative Example 3, while the thermoplastic resin had a low Q value (that is, the thermoplastic resin had a high viscosity), the insert block and the second insert block were made of the same partially stabilized zirconia ceramic as that in Example 1, so that the cavity could be filled with the molten thermoplastic resin even if the resin temperature was set at 350° C. However, the obtained light guiding plate had a poor flatness value.

TABLE 1

| | Unit | Example 1 | Example 2 | Example 3 | Example 4 |
|---|---|---|---|---|---|
| Light guiding plate nominal dimension | inch | 2.3 | 2.6 | 3.0 | 2.0 |
| Cavity thickness | mm | 0.27 | 0.27 | 0.37 | 0.27 |
| Insert block and 2nd insert block | | made of zirconia | | | made of steel |
| Thermoplastic resin | | Polycarbonate | | | |
| Viscosity average molecular weight | × 10$^4$ | 1.4 | 1.35 | 1.2 | 1.4 |
| Q value | × 10$^{-2}$ cm$^3$·sec$^{-1}$ | 65 | 100 | 120 | 65 |
| Molding conditions | | | | | |
| Resin temperature | ° C. | 330 | 340 | 340 | 350 |
| Mold temperature | ° C. | 120 | same as the left-hand side | same as the left-hand side | same as the left-hand side |
| Resin injection speed | mm·sec$^{-1}$ | 1500 | 1200 | 300 | 700 |
| Injection rate | cc·sec$^{-1}$ | 923 | 739 | 185 | 431 |
| Light guiding plate | | | | | |
| Length $L_L$ | mm | 52 | 58 | 64 | 44 |
| Length $L_S$ | mm | 32 | 42 | 52 | 30 |
| Average thickness | mm | 0.298 | 0.301 | 0.403 | 0.308 |
| Thickness difference | μm | 29 | 38 | 67 | 48 |
| Flatness | μm | 104 | 85 | 115 | 134 |
| Values of (x, y) | | (0.345, 0.295) | (0.352, 0.304) | (0.358, 0.312) | (0.368, 0.325) |
| Luminance average | cd/m$^2$ | 4528 | 4271 | 3977 | 4368 |

TABLE 2

|  | Unit | Comparative Example 1 | Comparative Example 2 | Comparative Example 3 |
|---|---|---|---|---|
| Light guiding plate nominal dimension | inch | 2.3 | same as the left-hand side | same as the left-hand side |
| Cavity thickness | mm | 0.27 | same as the left-hand side | same as the left-hand side |
| Insert block and 2nd insert block |  | made of steel | same as the left-hand side | made of zirconia |
| Thermoplastic resin |  |  | Polycarbonate |  |
| Viscosity average molecular weight | $\times 10^4$ | 1.6 | same as the left-hand side | same as the left-hand side |
| Q value | $\times 10^{-2}$ cm$^3 \cdot$sec$^{-1}$ | 36 | same as the left-hand side | same as the left-hand side |
| Molding conditions |  |  |  |  |
| Resin temperature | °C. | 350 | 370 | 350 |
| Mold temperature | °C. | 120 | same as the left-hand side | same as the left-hand side |
| Resin injection speed | mm·sec$^{-1}$ | 1500 | 1200 | 700 |
| Injection rate | cc·sec$^{-1}$ | 923 | 739 | 431 |
| Light guiding plate |  |  |  |  |
| Length $L_L$ | mm | 52 | same as the left-hand side | same as the left-hand side |
| Length $L_S$ | mm | 32 | same as the left-hand side | same as the left-hand side |
| Average thickness | mm | 0.425 | 0.325 | 0.301 |
| Thickness difference | μm | 125 | 85 | 50 |
| Flatness | μm | 520 | 230 | 210 |
| Values of (x, y) |  | Not filled | (0.395, 0.359) | (0.383, 0.342) |
| Luminance average | cd/m$^2$ | Not filled | 2750 | 4432 |

EXAMPLE 5

Example 5 relates to the process for manufacturing a light guiding plate of the present invention. Example 5 also used the same injection molding machine as that used in Example 1. Further, aromatic polycarbonate resins having viscosity average molecular weights and Q values shown in Table 3 were used as a transparent resin and were injection-molded. Further, Example 5 employed molding conditions such as a resin temperature, a mold temperature, a resin injection speed, a clamping force $F_0$, a clamping force $F_1$ and a time t as shown in Table 3. Further, Table 3 shows longitudinal-direction lengths $L_L$ of the obtained light guiding plates 40, which are lengths from the first side wall 44 to the third side wall 46 of the light guiding plates 40, lengths $L_S$ in the direction at right angles with the longitudinal direction, average thicknesses, thickness differences, a flatnesses, (x,y) values and average luminance values of the light guiding plates 40.

In Example 5, the second mold member (fixed mold member) 13 and the first mold member (movable mold member) 10 were clamped with a clamping force $F_0$ to bring them into a state shown in FIGS. 2(A) and 2(B), and the thermoplastic resin, which was measured, elasticized and melted in the injection cylinder 200, was injected into the cavity 18 through a sprue 215 and the molten resin injection portion 19 (having a side gate structure). The molten thermoplastic resin in a predetermined amount (amount for completely filling the cavity 18) was injected into the cavity 18 through the molten resin injection portion 19, and after an elapse of t second(s) from completion of the step of injecting the molten thermoplastic resin into the cavity 18, or after an elapse of t second(s) from completion of the dwelling step that follows the step of injecting the molten thermoplastic resin into the cavity 18, the clamping force was adjusted to 0.5 $F_0$ or less. After the thermoplastic resin in the cavity 18 was cooled to solidness, the second mold member (fixed mold member) 13 and the first mold member (movable mold member) 10 were unclamped, and the light guiding plate was taken out.

TABLE 3

|  | Unit | Example 5-1 | Example 5-2 | Example 5-3 | Example 5-4 |
|---|---|---|---|---|---|
| Light guiding plate nominal dimension | inch | 2.3 | 2.6 | 3.0 | 2.0 |
| Cavity thickness | mm | 0.27 | 0.27 | 0.37 | 0.27 |
| Insert block and 2nd insert block |  |  | made of zirconia |  | made of steel |
| Thermoplastic resin |  |  | Polycarbonate |  |  |
| Viscosity average molecular weight | $\times 10^4$ | 1.4 | 1.35 | 1.2 | 1.4 |
| Q value | $\times 10^{-2}$ cm$^3 \cdot$sec$^{-1}$ | 65 | 100 | 120 | 65 |

TABLE 3-continued

| | Unit | Example 5-1 | Example 5-2 | Example 5-3 | Example 5-4 |
|---|---|---|---|---|---|
| Molding conditions | | | | | |
| Resin temperature | °C. | 330 | 340 | 340 | 350 |
| Mold temperature | °C. | 120 | same as the left-hand side | same as the left-hand side | same as the left-hand side |
| Resin injection speed | mm·sec$^{-1}$ | 1500 | 1200 | 300 | 700 |
| Injection rate | cc·sec$^{-1}$ | 923 | 739 | 185 | 431 |
| Molding conditions | | | | | |
| Holding pressure | ×10$^6$ Pa | 70 | same as the left-hand side | same as the left-hand side | same as the left-hand side |
| Dwelling time period (t') | second | 1.5 | same as the left-hand side | same as the left-hand side | same as the left-hand side |
| Clamping force F$_0$ | ×10$^5$ N (ton·f) | 4.9 (50) | same as the left-hand side | same as the left-hand side | same as the left-hand side |
| Clamping force F$_1$ | ×10$^5$ N (ton·f) | 0 | 2.0 (20) | 0.98 (10) | 0 |
| F$_1$/F$_0$ | | 0 | 0.4 | 0.2 | 0 |
| Time t | second | 0.5 | 2 | 4 | 0 |
| Light guiding plate | | | | | |
| Length L$_L$ | mm | 52 | 58 | 64 | 44 |
| Length L$_S$ | mm | 32 | 42 | 52 | 30 |
| Average thickness | mm | 0.295 | 0.298 | 0.398 | 0.303 |
| Thickness difference | μm | 27 | 35 | 63 | 44 |
| Flatness | μm | 40 | 25 | 63 | 68 |
| Values of (x, y) | | (0.343, 0.293) | (0.352, 0.303) | (0.357, 0.312) | (0.368, 0.323) |
| Luminance average | cd/m$^2$ | 4532 | 4302 | 4005 | 4379 |

It is seen from Table 3 that when the process for manufacturing a light guiding plate in Example 5 is employed, further excellent values can be obtained as a value of flatness of the light guiding plate.

The present invention has been explained hereinabove with reference to preferred Examples, while the present invention shall not be limited thereto. The structure of the mold assembly, the transparent thermoplastic resins used, the injection-molding conditions, the constitutions and structures of the inert blocks and the second insert blocks and the constitution and structures of the light guiding plates in Examples are shown as examples and may be modified as required.

Figure 11:
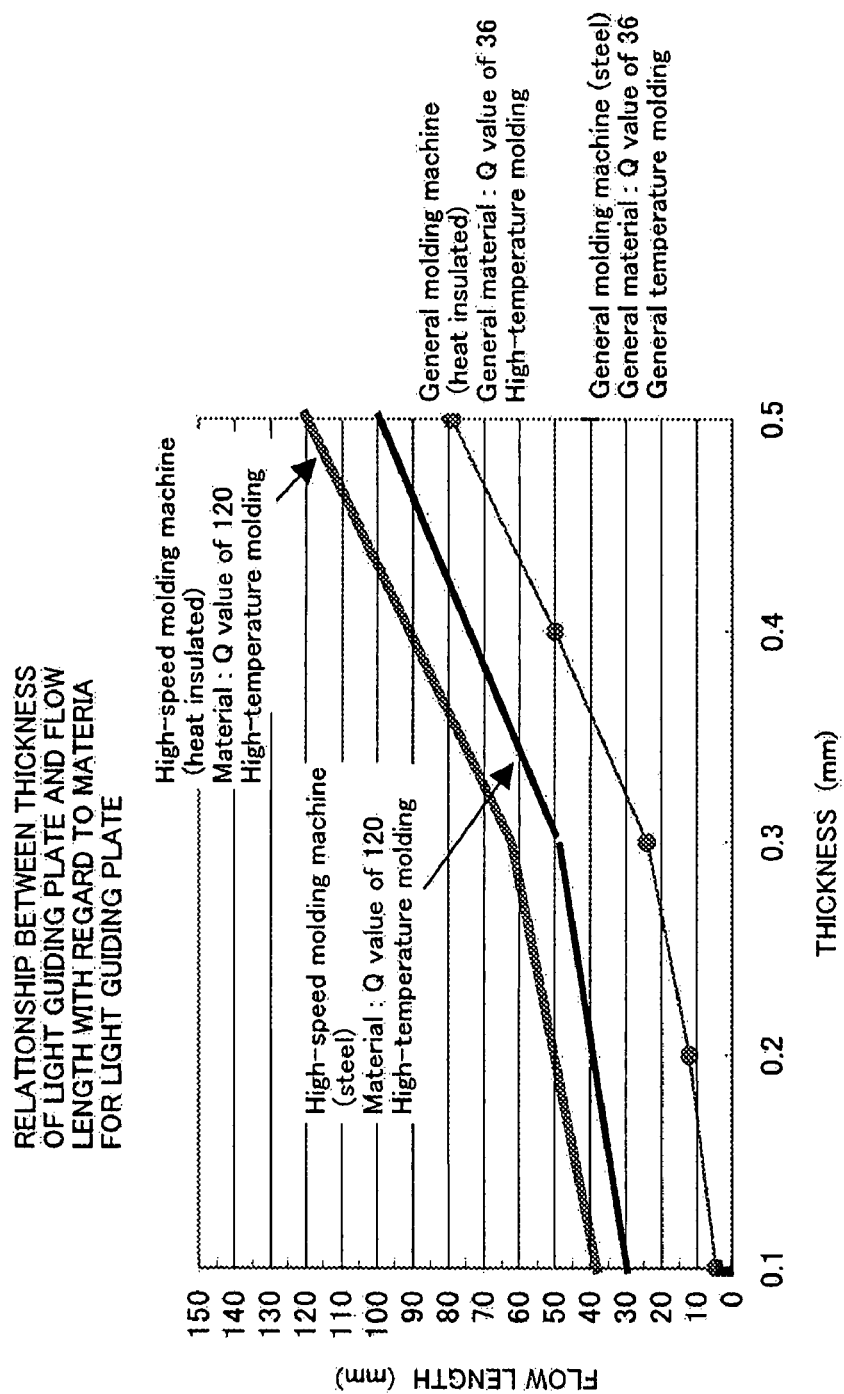
FIG. 11 is a graph showing a relationship between the thickness of a light guiding plate and the length, measured in the longitudinal direction, of the light guiding plate, obtained by carrying out various tests using the same aromatic polycarbonate resin as that in Example 3.

FIG. 11 shows results of various tests of aromatic polycarbonate resins. In FIG. 11, the value (unit: mm) of "thickness" in the axis of abscissas means a thickness of the light guiding plate, and the value (unit: mm) of "flow length" in the axis of ordinates means the longitudinal-direction length of the light guiding plate, which is a length from the first side wall to the third side wall. Further, "high-speed molding machine (heat-insulated)", "high-speed molding machine (steel)", "general molding machine (heat insulated), "general molding machine (steel)", "high-temperature molding", "general temperature", "material" and "general material" have the following meanings.

"High-speed molding machine (heat insulated)": The same insert block as that explained in Example 1 was used, and injection molding was carried out at a resin injection speed of 2000 mm·second$^{-1}$.

"High-speed molding machine (steel)": An insert block made of steel was used, and injection molding was carried out at a resin injection speed of 2000 mm·second$^{-1}$.

"General molding machine (heat insulated)": The same insert block as that explained in Example 1 was used, and injection molding was carried out at a resin injection speed of 100 mm·second$^{-1}$.

"General molding machine (steel)": An insert block made of steel was used, and injection molding was carried out at a resin injection speed of 100 mm·second$^{-1}$.

"High-temperature molding": Injection molding was carried out at a resin temperature of 350° C. and at a mold temperature of 120° C.

"General temperature molding": Injection molding was carried out at a resin temperature of 290° C. and at a mold temperature of 80° C.

"Material": An aromatic polycarbonate resin having a viscosity average molecular weight of 1.2×10$^4$ and a Q value of 1.20.

"General material": An aromatic polycarbonate resin having a viscosity average molecular weight of 1.6×10$^4$ and a Q value of 0.36.

FIG. 11 shows that the use of the insert block made of zirconia ceramic enables the production of the light guiding plate having a largest longitudinal-direction length, that the use of the thermoplastic resin having a high Q value enables the production of the light guiding plate having a largest longitudinal-direction length, and that molding at a high temperature enables the production of the light guiding plate having a largest longitudinal-direction length.

The insert block 20 can be instead produced by the following method. The second insert block 30 can be also similarly produced.

First, the partially stabilized zirconia is press-molded and the resultant press-molded product is sintered to obtain an insert block body 21. Then, that surface of the insert block body 21 which is to face the cavity 18 is blast-treated with alumina particles such that the surface has a surface roughness R$_z$ of 2 μm. Then, a 2 μm thick NI—P layer is formed on the above surface of the insert block body 21 by an electroless plating method, and then a 5 μm thick Ni layer is formed thereon by an electric plating method. Further, a 100 μm thick Ni—P layer is formed thereon by an electroless plating method. Then, the Ni—P layer is machined with a diamond turning tool having a sawteeth (prism)-shaped concavo-convex portions to form concavo-convex portions in the metal layer 22.

Alternatively, the insert block body 21 may be made of partially stabilized electrically conductive zirconia ceramic. The metal layer 22 is formed on that surface of the insert block body 21 which is to face the cavity. That is, the insert block body 21 is made of partially stabilized zirconia ($ZrO_2$—$Y_2O_3$) ceramic and contains 8% by weight of $Fe_2O_3$ as an electrically conducting agent. The content of $Y_2O_3$ as a partially stabilizing agent in the partially stabilized zirconia ceramic is 3 mol %. The above electrically conductive zirconia ceramic has a thermal conductivity of approximately 3.8 J/(m·s·K) and a specific volume resistivity of $1 \times 10^8$ Ω·cm. The metal layer 22 is made of chromium (Cr). The metal layer 22 is formed on the entire surface of the insert block body 21 by an electric plating method.

FIGS. 4(A) to 4(E), FIGS. 5(A) and 5(B), FIGS. 6(A) and 6(B), FIGS. 7(A) to 7(D) and FIGS. 8(A) and 8(B) show various variants.

FIGS. 4(A) to 4(E) and FIGS. 7(A) to 7(D) show schematic cross-sectional views of light guiding plates 40A to 40E and light guiding plates 140A to 140E. In general, they have the form of a wedged truncated pyramid. Two opposed side walls of the truncated pyramid correspond to the first main surface 41, 141 and the second main surface 43, 143 of the light guiding plate, the bottom surface of the truncated pyramid corresponds to the first side wall 44, 144 (large-thickness end portion) of the light guiding plate, the top surface of the truncated pyramid corresponds to the third side wall 46, 146 of the light guiding plate, and the remaining opposed two side walls of the truncated pyramid correspond to the second side wall 45, 145 and the fourth side wall 47, 147 of the light guiding plate. And, light enters the light guiding plate through the first side wall 44, 144 and is emitted from the first main surface 41, 141 and/or the second main surface 43, 143. The first side wall (light-entering surface) corresponding to the bottom surface of the truncated pyramid has a thickness, for example, of 0.5 mm and the third side wall 46, 146 corresponding to the top surface of the truncated pyramid has a thickness, for example, of 0.2 mm. The light guiding plate has a width, for example, of 42 mm and a length, for example, of 58 mm. The above width of the light guiding plate means a length of the light guiding plate in the direction perpendicular to the paper surfaces of FIGS. 4 and 7, and the length of the light guiding plate means a length of the light guiding plate in the leftward and rightward directions in parallel with the paper surfaces of FIGS. 4 and 7.

Figure 4A:
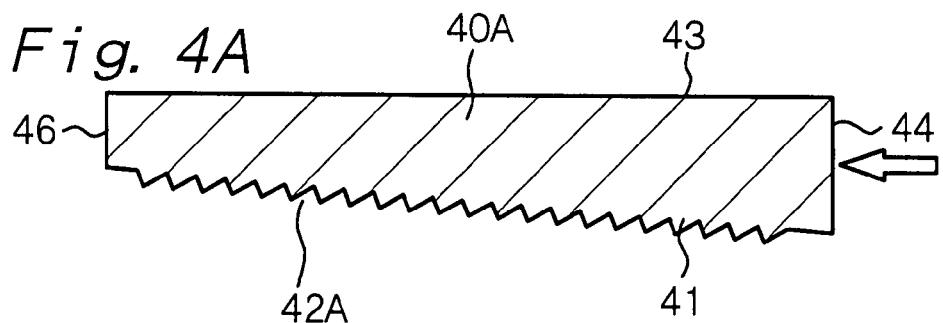
FIGS. 4(A) to 4(E) are schematic cross-sectional views of variants of the light guiding plate, respectively.

In the light guiding plate 40A whose schematic cross-sectional view is shown in FIG. 4(A), the concavo-convex portions 42A formed in the surface portion of the first main surface 41 have a continuous and straightly linear concave and convex form that is extending in the direction having a predetermined angle (specifically, in the direction nearly at right angles) with the direction in which light enters the light guiding plate 40A. When the light guiding plate 40A is cut with an imaginary plane that extends in the direction in which light enters the light guiding plate 40A and that is perpendicular to the first main surface 41, the continuous concave and convex forms have the form of sawteeth (cross-sectional form: triangle). In the drawings, the same reference numerals as those in FIG. 1(A) stand for the same components.

Figure 4B:
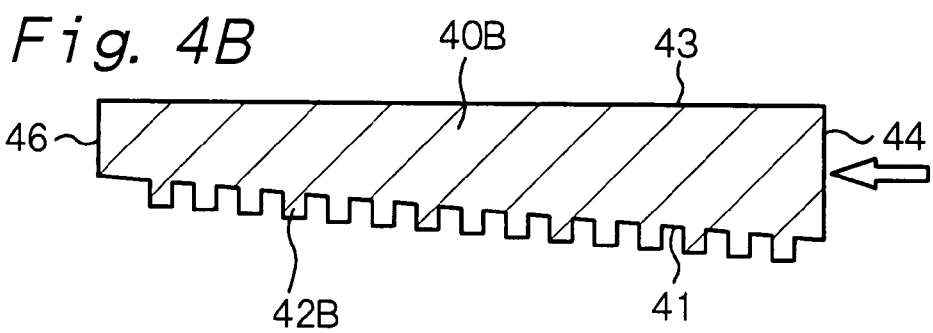
Figure 5A:
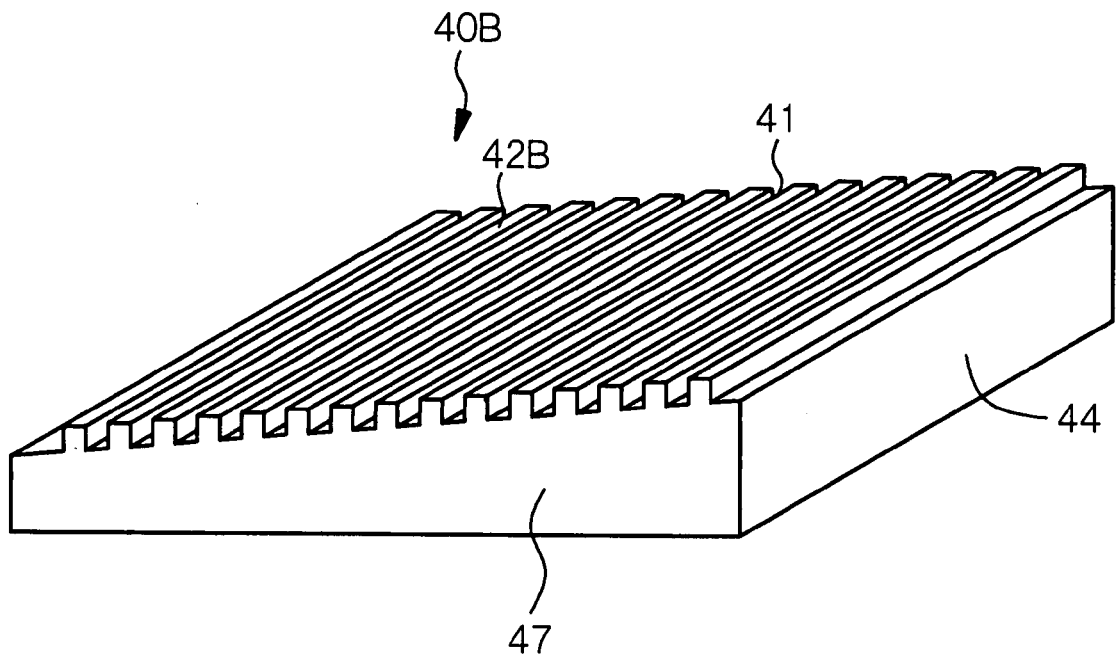
FIGS. 5(A) and 5(B) are schematic perspective views of the variants of the light guiding plates shown in FIGS. 4(B) and 4(C), respectively.

In the light guiding plate 40B whose schematic cross-sectional view is shown in FIG. 4(B) and whose schematic perspective view is shown in FIG. 5(A), the convex portions 42B formed in the surface portion of the first main surface 41 have a continuous and straightly linear convex form that is extending in the direction having a predetermined angle (specifically, in the direction nearly at right angles) with the direction in which light enters the light guiding plate 40B. When the light guiding plate 40B is cut with an imaginary plane that extends in the direction in which light enters the light guiding plate 40B and that is perpendicular to the first main surface 41, the continuous convex form is a trapezoidal form.

Figure 4C:
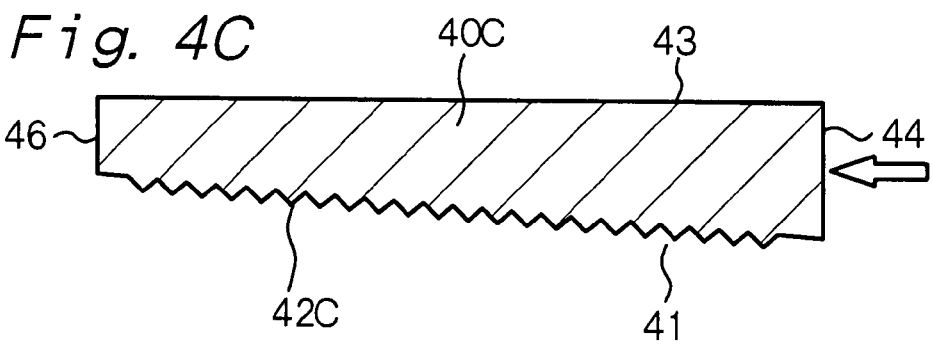
Figure 5B:
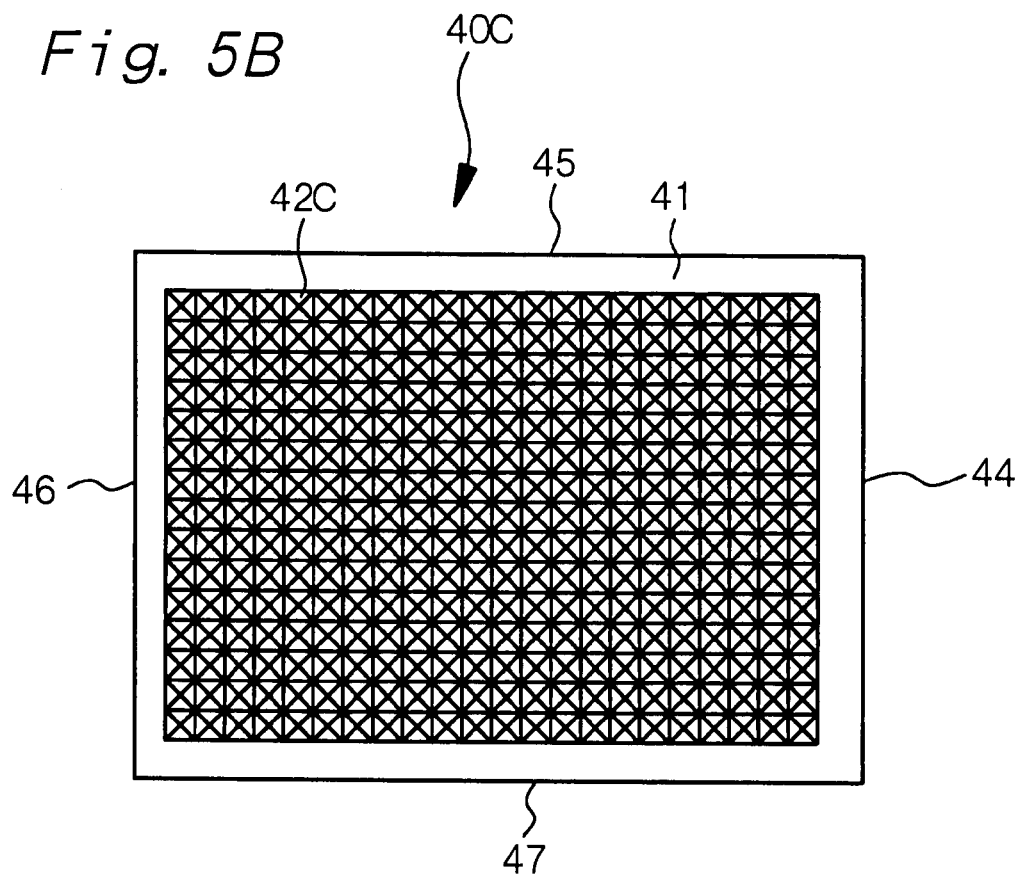

In the light guiding plate 40C whose schematic cross-sectional view is shown in FIG. 4(C) and whose schematic perspective view is shown in FIG. 5(B), the convex portions 42C formed in the surface portion of the first main surface 41 have discontinuous convex forms arranged on an imaginary straight line in the direction having a predetermined angle (in the direction nearly at right angles) with the direction in which light enters the light guiding plate 40C, and the discontinuous convex form is a pyramidal form.

Figure 4D:
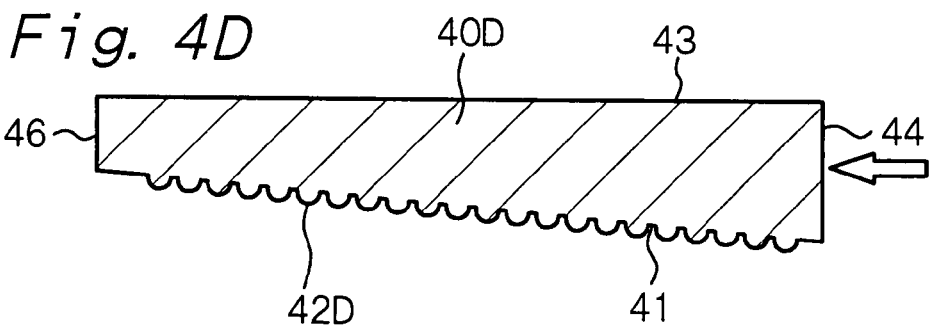

Further, in the light guiding plate 40D whose schematic cross-sectional view is shown in FIG. 4(D) and whose schematic perspective view is shown in FIG. 6(A), the convex portions 42D formed in the surface portion of the first main surface have discontinuous convex forms arranged on an imaginary straight line in the direction having a predetermined angle (in the direction nearly at right angles) with the direction in which light enters the light guiding plate, and the discontinuous convex form is a nearly semispherical form.

Figure 4E:
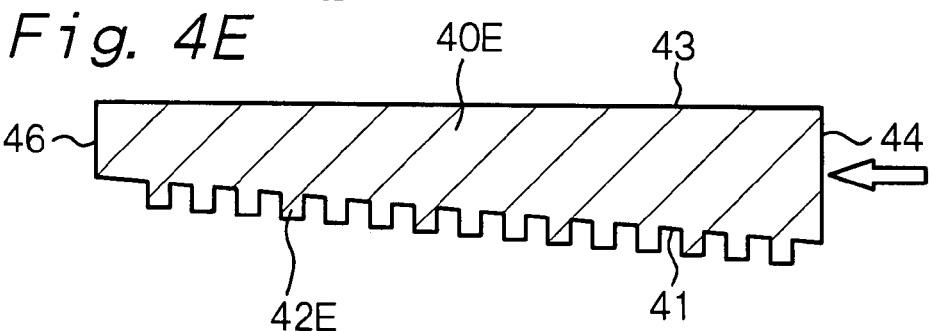

Further, in the light guiding plate 40E whose schematic cross-sectional view is shown in FIG. 4(E) and whose schematic perspective view is shown in FIG. 6(B), the convex portions 42E formed in the surface of the first main surface have discontinuous convex forms arranged on an imaginary straight line in the direction having a predetermined angle (specifically, in the direction nearly at right angles) with the direction in which light enters the light guiding plate, and the discontinuous convex form is a columnar form.

Figure 7A:
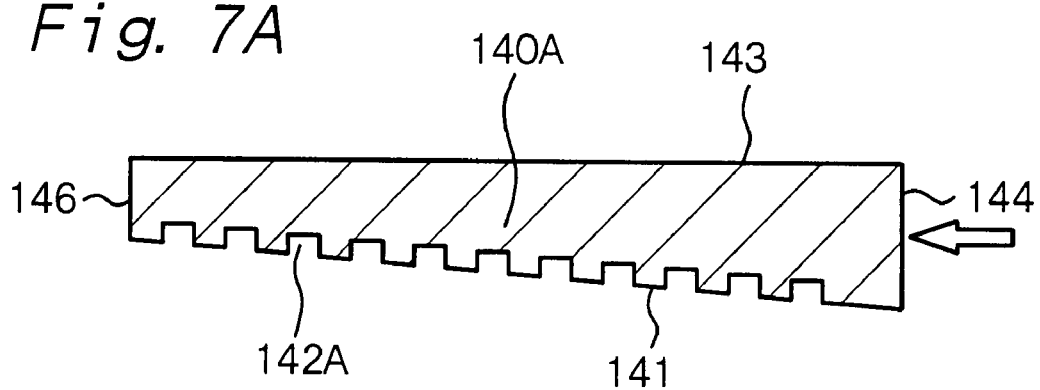
FIGS. 7(A) to 7(D) are schematic cross-sectional views of other variants of the light guiding plate, respectively.
Figure 8A:
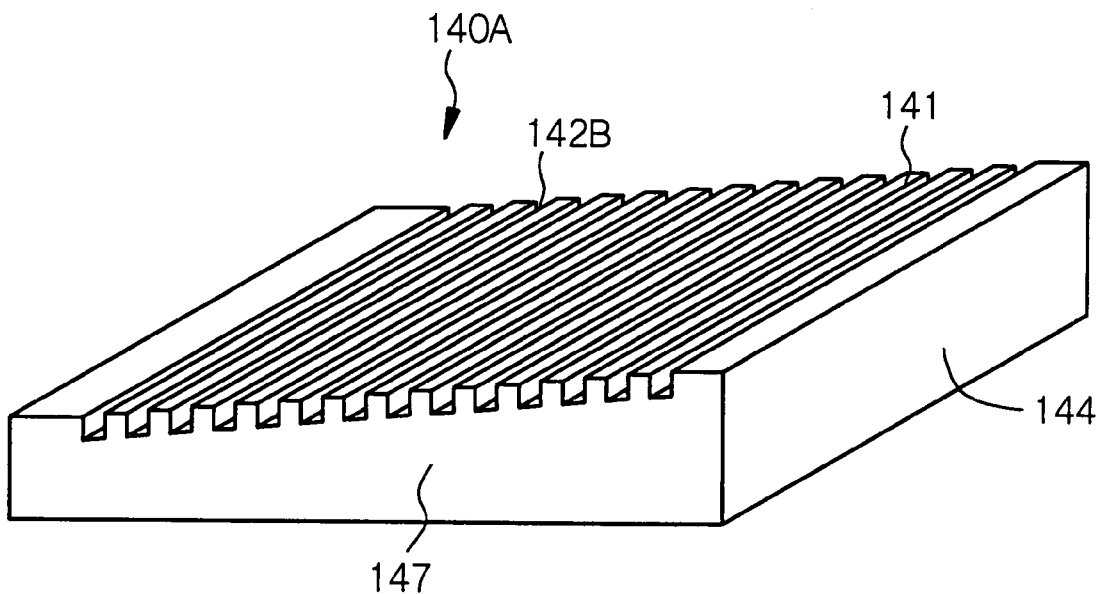
FIGS. 8(A) and 8(B) are schematic perspective views of the variants of the light guiding plates shown in FIGS. 7(A) and 7(B), respectively.

In the light guiding plate 140A whose schematic cross-sectional view is shown in FIG. 7(A) and whose schematic perspective view is shown in FIG. 8(A), the concave portions 142A formed in the surface portion of the first main surface 141 have a continuous and straightly linear concave form arranged in the direction having a predetermined angle (specifically, in the direction nearly at right angles) with the direction in which light enters the light guiding plate 140A, and when the light guiding plate 140A is cut with an imaginary plane that is in the direction in which light enters the light guiding plate 140A and that is perpendicular to the first main surface 141, the continuous concave form is a trapezoidal form.

Figure 7B:
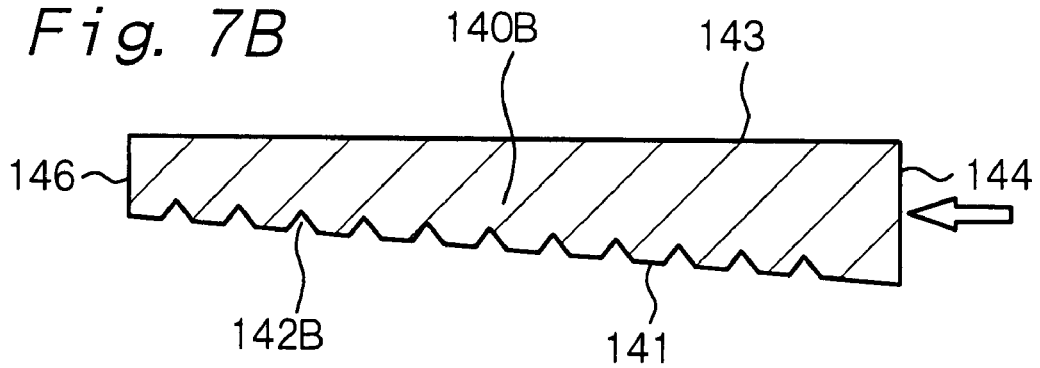
Figure 8B:
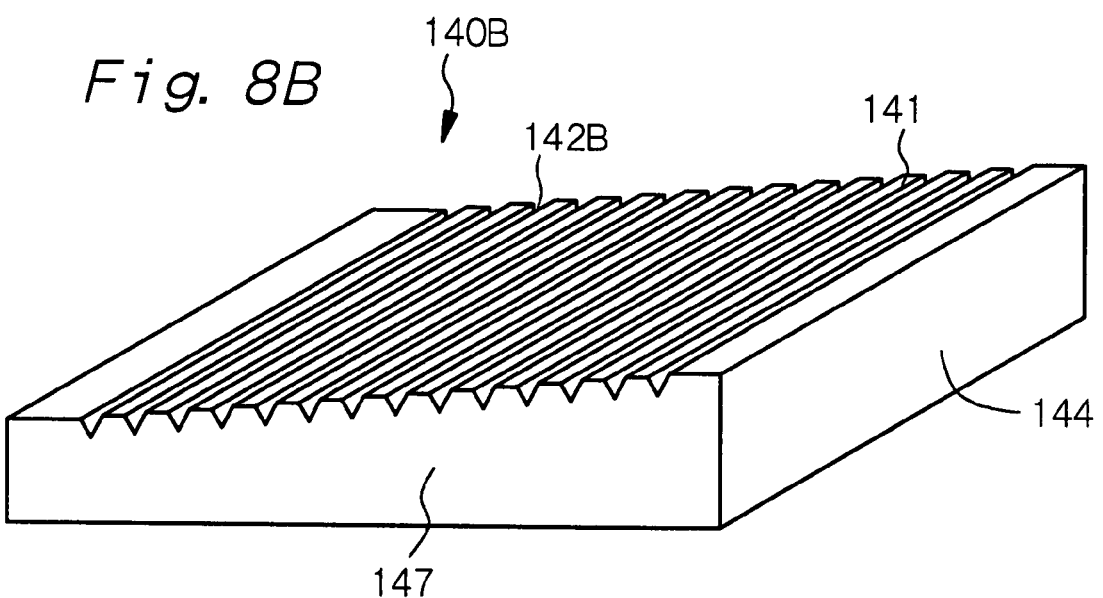

In the light guiding plate 140B whose schematic cross-sectional view is shown in FIG. 7(B) and whose schematic perspective view is shown in FIG. 8(B), the concave portions 142B formed in the surface portion of the first main surface 141 have a continuous and straightly linear concave form arranged in the direction having a predetermined angle (specifically, in the direction nearly at right angles) with the direction in which light enters the light guiding plate 140B, and when the light guiding plate 140B is cut with an imaginary plane that is in the direction in which light enters the light guiding plate 140B and that is perpendicular to the first main surface 141, the continuous concave form is a triangular form.

Figure 7C:
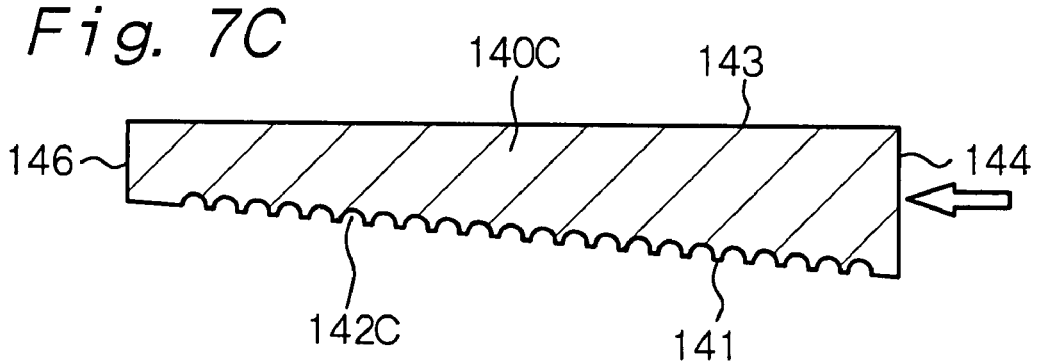

In the light guiding plate 140C whose schematic cross-sectional view is shown in FIG. 7(C), the concave portions 142C formed in the surface portion of the first main surface 141 have discontinuous concave forms arranged on an imaginary straight line having a predetermined angle (in the direction nearly at right angles) with the direction in which light enters the light guiding plate 140C, and the discontinuous concave form is a nearly semispherical form.

Figure 7D:
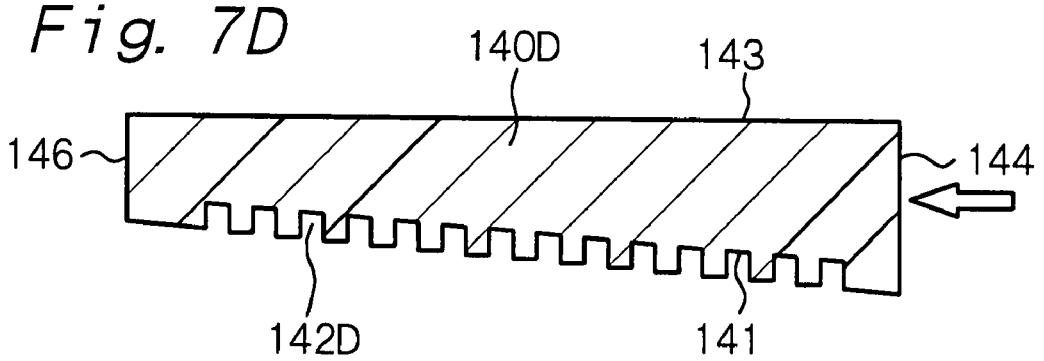

Further, in the light guiding plate 140D whose schematic cross-sectional view is shown in FIG. 7(D), the concave portions 142D formed in the surface portion of the first main surface 141 have discontinuous concave forms arranged on an imaginary straight line in the direction having a predetermined angle (specifically, in the direction nearly at right angles) with the direction in which light enters the light guiding plate 140D, and the discontinuous concave form is a columnar form.

Figure 9A:
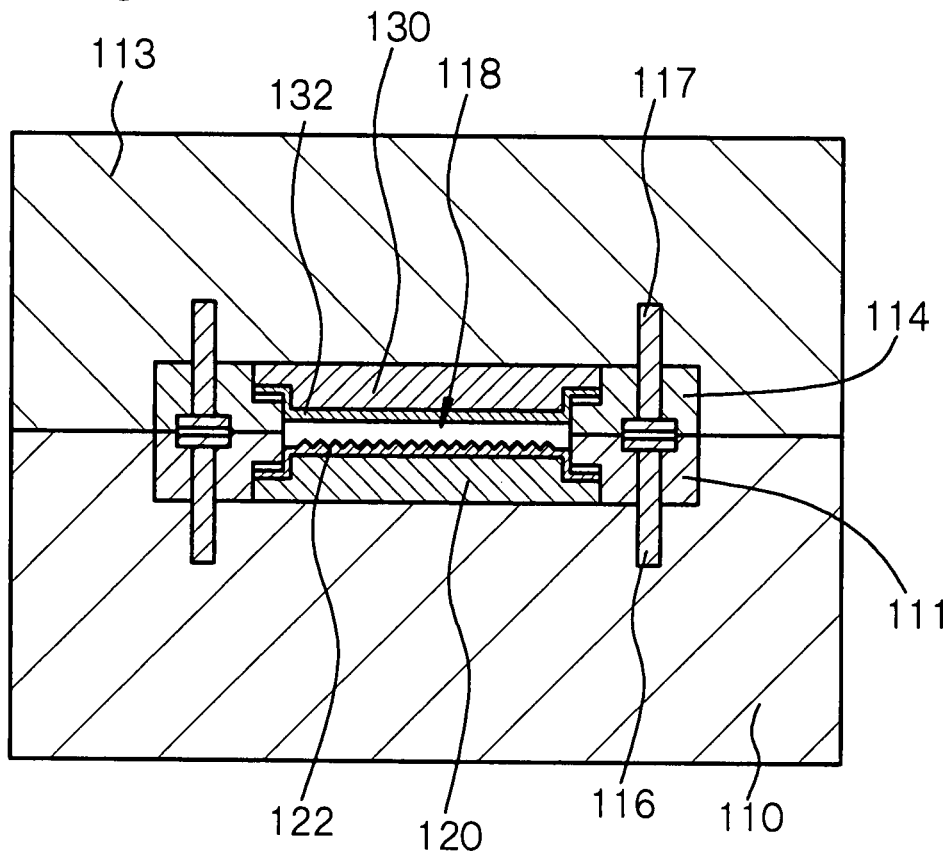
FIGS. 9(A), 9(B) and 9(C) are a schematic cross-sectional view of a variant of the mold assembly in a clamped state, a schematic partial cross-sectional view of a variant of the insert block and a schematic cross-sectional view of a variant of the insert block body, respectively.

As a method for fixing the insert block 20 and the second insert block 30 to the first mold member (movable mold member) 10 and the second mold member (fixed mold member) 13, the fixing method explained in Example 1 may be replaced, for example, with the following method. That is, FIG. 9(A) shows a state where the mold assembly is clamped, and FIG. 10(A) shows a state where the mold assembly is opened. The mold assembly shown in the schematic cross-sectional views of FIGS. 9(A) and 10(A) has (A) a mold comprising a first mold member (movable mold member) 110 and a second mold member (fixed mold member) 113 in which a cavity 118 is formed when these mold members are clamped, to produce a light guiding plate made of a transparent resin, (B) a side gate type molten resin injection portion (not shown) for introducing the molten transparent resin into the cavity 118, (C) an insert block 120 arranged in the first mold member 110 for constituting part of the cavity 118, and (D) a second insert block 130 arranged in the second mold member 113 for constituting part of the cavity 118.

The mold assembly is provided with a covering plate 111 that is attached to the first mold member 110 with bolts 116, that constitutes part of the cavity 118 and that covers an end surface of the insert block 120. The covering plate 111 covers the end surface of the entire circumference of the insert block 120. Further, the mold assembly is further provided with a second covering plate 114 that is attached to the second mold member 113 with bolts 117, that constitutes part of the cavity 118 and that covers an end surface of the second insert block 130. The second covering plate 114 covers the end surface of the entire circumference of the second insert block 130. The covering plate 111 and the second covering plate 114 are provided with a molten resin injection portion (not shown) each.

Figure 9B:
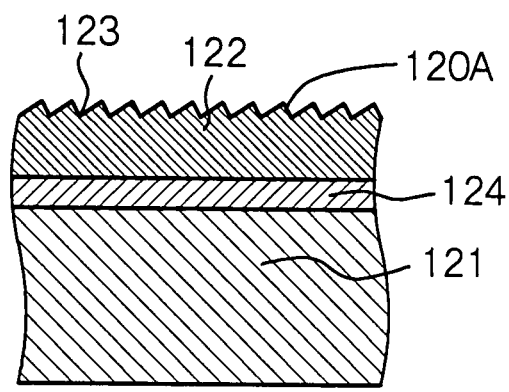
Figure 9C:
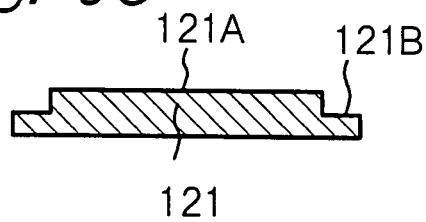

The insert block 120 (thickness 3.0 mm), whose schematic enlarged cross-sectional view is shown in FIG. 10(B) and whose schematic enlarge partial cross-sectional view is shown in FIG. 9(B), is used for forming the first main surface of the light guiding plate, and comprises an insert block body 121 and a metal layer 122. The insert block body 121 is made of partially stabilized zirconia ceramic (partially stabilized zirconium oxide, $ZrO_2$) containing yttrialite ($Y_2O_3$) as a partially stabilizing agent. The metal layer 122 is arranged on that surface of the insert block body 121 that is to face the cavity 118 for forming the first main surface of the light guiding plate, and has concavo-convex portions having a sawteeth (prism) form. FIG. 9(C) shows a schematic cross-sectional view of the insert block body 121. The concavo-convex portions 123 formed in the metal layer 122 have a continuous concave form extending in the direction having a predetermined angle (specifically, in the direction nearly at right angles) with the direction in which light enters the light guiding plate, and they further have a form complementary to the concavo-convex portions formed in the first main surface 41 of the light guiding plate 40. A portion where these concavo-convex portions 123 are formed corresponds to the cavity surface 120A of the insert block 120.

The metal layer 122 is formed of two layers or a 5 μm thick Ni layer formed by electric plating and a 100 μm thick Ni compound layer formed thereon (Ni—P layer formed by electroless plating). That is, the metal layer 122 has a thickness t of 105 μm. In the drawings, the metal layer 122 is shown as one layer. That surface of the insert block body 121 which is to face the cavity 118 has a surface roughness $R_z$ of 0.5 μm. Further, between the insert block body 121 and the metal layer 122 is formed an activated metal film 124 formed of a 10 μm thick Ti—Cu—Ag eutectic composition. The activated metal film 124 is formed by an active metal soldering method.

In a state where the first mold member 110 and the second mold member 113 are clamped, a metal layer 122B (see FIG. 10(B)) having a flat surface is formed on that surface of the insert block body 121 which faces the covering plate 111. The above metal layer 122B is formed simultaneously with the metal layer 122, and the activated metal film 124 is formed beneath the metal layer 122B.

Specifically, the insert block body 121 was produced by press-molding a mixture of zirconia ($ZrO_2$) powder with $Y_2O_3$ powder and calcining the resultant press-molded product (see the schematic cross-sectional view of FIG. 9(C)). Then, that surface (to be referred to as "surface 121A") of the insert block body 121 which was to face the cavity 118 and that surface (to be referred to as "surface 121B" of the insert block body 121 which was to face the covering plate 111 were polished and finished using a diamond whetstone, so that these surfaces 121A and 121B had a surface roughness $R_z$ of 0.5 μm. Then, the activated metal film was formed on these surfaces 121A and 121B of the insert block body 121 by an active metal soldering method. Specifically, a paste containing a Ti—Cu—Ag eutectic composition was applied to these surfaces 121A and 121B of the insert block body 121 and the applied paste was baked in a vacuum at a high temperature of approximately 800° C. to form the activated metal film 124. Then, that portion of the insert block body 121 which was other than the portion where the activated metal film 124 was formed was masked, a nickel layer was formed by an electric plating method and an Ni—P layer was formed thereon by an electroless plating method. Then, the Ni—P layer was machined with a diamond turning tool having sawteeth (prism)-shaped concavo-convex portions to form concavo-convex portions 123 in the metal layer 122.

The second insert block 130 has substantially the same constitution and the same structure as those of the insert block 120 except that the surface (cavity surface) is flat. The metal layer 132 has a surface roughness $R_z$ of 0.01 μm.

The first mold member (movable mold member) 110 was produced from carbon steel S55C and cut to form an insert block attaching portion. The metal layer 122B formed on the surface 121B was cut with a metal-working surface cutting machine. And, the insert block 120 was attached to the insert block attaching portion, the end surface of the insert block 120 was covered with the covering plate 111 and the covering plate 111 was fixed to the first mold member 110 with the bolts 116.

Further, the second mold member (fixed mold member) 113 was produced from carbon steel S55C and cut to form an insert block attaching portion. And, the second insert block 130 was attached to the insert block attaching portion, the end surface of the insert block 130 was covered with the second covering plate 114 and the second covering 114 was fixed to the second mold member 113 with the bolts 117.

With the thus-obtained mold assembly, light guiding plates could be produced by injection-molding in the same manner as in the method explained in Examples 1 to 5.

The invention claimed is:

1. A light guiding plate being made of a transparent thermoplastic resin and having a first main surface, a second main surface opposed to the first main surface, a first side wall, a second side wall, a third side wall opposed to the first side wall and a fourth side wall opposed to the second side wall,
   wherein the surface portion of the first main surface is provided with convex portions and/or concave portions,
   the light guiding plate has a longitudinal-direction length, which is a length from the first side wall to the third side wall, of 40 mm to 130 mm,
   at least an 80% region of the light guiding plate has a thickness of 0.1 mm to 0.55 mm,
   the light guiding plate has a flatness of 200 μm or less,
   the thermoplastic resin has a Q value of 0.5 $cm^3 \cdot second^{-1}$ or more, and
   the thermoplastic resin is an aromatic polycarbonate resin having a viscosity average molecular weight of $1.0 \times 10^4$ to $1.5 \times 10^4$.

2. The light guiding plate according to claim 1, wherein used is a mold assembly which has a cavity and a molten resin injection portion for injecting a molten thermoplastic resin into the cavity from a cavity surface corresponding to one side wall of the light guiding plate, and the light guiding plate is produced by injecting a transparent molten thermoplastic resin into the cavity through the molten resin injection portion.

3. The light guiding plate according to claim 2, wherein the mold assembly has an insert block arranged therein, the insert block comprising an insert block body made of zirconia ceramic or electrically conductive zirconia ceramic and a metal layer having concave portions and/or convex portions and being arranged on that surface of the insert block body which faces the cavity for forming the concave portions and/or the convex portions on the first main surface of the light guiding plate.

4. The light guiding plate according to claim 2, wherein light enters the first side wall of the light guiding plate, and a molten thermoplastic resin is injected into the cavity from that surface of the cavity which corresponds to the third side wall of the light guiding plate.

5. The light guiding plate according to claim 1, wherein x and y values of the light guiding plate in an xy chromaticity diagram in a CIE 1931 XYZ color system satisfy $x \leq 0.375$ and $y \leq 0.335$.

6. The light guiding plate according to claim 1, wherein the light guiding plate has a thin-plate-shaped form with a nearly constant thickness as a whole, and light enters the first side wall of the light guiding plate and the light is emitted from the first main surface and/or the second main surface.

7. The light guiding plate according to claim 1, wherein the light guiding plate has a wedged form of a truncated pyramid as a whole,
   the two opposed side walls of the truncated pyramid correspond to the first main surface and second main surface of the light guiding plate, the bottom surface of the truncated pyramid corresponds to the first side wall of the light guiding plate, the top surface of the truncated pyramid corresponds to the third side wall of the light guiding plate, the remaining two opposed side walls of the truncated pyramid correspond to the second side wall and fourth side wall of the light guiding plate, and
   light enters the first side wall of the light guiding plate and the light is emitted from the first main surface and/or the second main surface.

8. A surface-emitting light source apparatus comprising a light guiding plate and a light source,
   wherein the light guiding plate is made of a transparent thermoplastic resin and has a first main surface, a second main surface opposed to the first main surface, a first side wall, a second side wall, a third side wall opposed to the first side wall and a fourth side wall opposed to the second side wall,
   the surface portion of the first main surface is provided with convex portions and/or concave portions,
   the light guiding plate has a longitudinal-direction length, which is a length from the first side wall to the third side wall, of 40 mm to 130 mm,
   at least an 80% region of the light guiding plate has a thickness of 0.1 mm to 0.55 mm,
   the light guiding plate has a flatness of 200 μm or less,
   the thermoplastic resin has a Q value of 0.5 $cm^3 \cdot second^{-1}$ or more,
   the thermoplastic resin is an aromatic polycarbonate resin having a viscosity average molecular weight of $1.0 \times 10^4$ to $1.5 \times 10^4$, and
   the light guiding plate is constituted to receive light through the first side wall and to emit light from the first main surface and/or the second main surface.

9. A process for manufacturing a light guiding plate that is made of a transparent thermoplastic resin and that has a first main surface, a second main surface opposed to the first main surface, a first side wall, a second side wall, a third side wall opposed to the first side wall and a fourth side wall opposed to the second side wall,
   wherein the surface portion of the first main surface is provided with convex portions and/or concave portions,
   the light guiding plate has a longitudinal-direction length, which is a length from the first side wall to the third side wall, of 40 mm to 130 mm,
   at least an 80% region of the light guiding plate has a thickness of 0.1 mm to 0.55 mm, and
   the light guiding plate has a flatness of 200 μm or less,
   the thermoplastic resin has a Q value of 0.5 $cm^3 \cdot second^{-1}$ or more, and
   the thermoplastic resin is an aromatic polycarbonate resin having a viscosity average molecular weight of $1.0 \times 10^4$ to $1.5 \times 10^4$,
   the process comprising providing a mold assembly having a cavity and a molten resin injection portion for injecting a molten thermoplastic resin into the cavity from a portion corresponding to one of the side walls of the light guiding plate, the mold assembly having a constitution of a first mold member and a second mold member,
   the process comprising;
   (A) clamping the first mold member and the second mold member with a clamping force $F_0$ to form the cavity;
   (B) injecting a transparent molten thermoplastic resin into the cavity from the molten resin injection portion;
   (C) adjusting the clamping force to 0.5 $F_0$ or less after an elapse of t second(s) from completion of the injection of the molten thermoplastic resin into the cavity or after an elapse of t second(s) from completion of a dwelling step that follows the injection of the molten thermoplastic resin into the cavity, wherein 0 second$\leq t \leq 8.0$ seconds, and
   (D) after cooling and solidification of the thermoplastic resin in the cavity, disassembling the first mold member and the second mold member to take out the light guiding plate.

\* \* \* \* \*